United States Patent
Hou et al.

(10) Patent No.: US 11,632,965 B2
(45) Date of Patent: Apr. 25, 2023

(54) FERMENTED MILK AND PREPARATION METHODS THEREOF

(71) Applicant: NORTHEAST AGRICULTURAL UNIVERSITY, Heilongjiang (CN)

(72) Inventors: Juncai Hou, Harbin (CN); Zhanmei Jiang, Harbin (CN); Jiage Ma, Harbin (CN); Jinpeng Li, Harbin (CN); Jialun Hu, Harbin (CN)

(73) Assignee: NORTHEAST AGRICULTURAL UNIVERSITY, Harbin (CN)

( * ) Notice: Subject to any disclaimer, the term of this patent is extended or adjusted under 35 U.S.C. 154(b) by 0 days.

(21) Appl. No.: 17/811,300

(22) Filed: Jul. 7, 2022

(65) Prior Publication Data
US 2023/0013996 A1  Jan. 19, 2023

(30) Foreign Application Priority Data
Jul. 8, 2021  (CN) .......................... 202110773164.8

(51) Int. Cl.
*A23C 9/137* (2006.01)
*A23C 9/13* (2006.01)
*A23J 3/08* (2006.01)
*A23J 3/24* (2006.01)
*A23J 3/26* (2006.01)

(52) U.S. Cl.
CPC .............. *A23C 9/1307* (2013.01); *A23J 3/08* (2013.01); *A23J 3/24* (2013.01); *A23J 3/26* (2013.01)

(58) Field of Classification Search
CPC ... A23C 9/1307; A23J 3/08; A23J 3/24; A23J 3/26
USPC ........................................................ 426/41
See application file for complete search history.

(56) References Cited

FOREIGN PATENT DOCUMENTS

| CN | 101267740 A | 9/2008 |
|---|---|---|
| CN | 102349656 A | 2/2012 |
| CN | 103583692 A | 2/2014 |
| CN | 104839423 A | 8/2015 |
| CN | 107467203 A | 12/2017 |
| CN | 109207399 A | 1/2019 |
| CN | 110338262 A | 10/2019 |

(Continued)

OTHER PUBLICATIONS

Translation of CN-112369495-A (Year: 2021).*

(Continued)

*Primary Examiner* — Brent T O'Hern
(74) *Attorney, Agent, or Firm* — Metis IP LLC

(57) ABSTRACT

Disclosed is a method of preparing a fermented milk. The method comprises: step 1, extruding whey protein at low temperature, mixing the extruded whey protein with inulin to prepare extruded whey protein isolate (WPI)-inulin composition; step 2, adding sucrose and the extruded WPI-inulin composition into the raw milk, and uniformly mixing and stirring the sucrose, the extruded WPI-inulin composition, and the raw milk to obtain a material A; step 3, preheating, homogenizing, sterilizing and cooling the material A to obtain a fermentation substrate; step 4, adding a fermentation agent into the fermentation substrate, filling the fermentation substrate in a container, and then performing heat-preserved fermentation, and ending the fermentation to obtain a material B; step 5, cooling the material B, and then refrigerating the material B to obtain fermented milk.

7 Claims, 25 Drawing Sheets

(56) References Cited

FOREIGN PATENT DOCUMENTS

| CN | 111642564 A | | 9/2020 |
|---|---|---|---|
| CN | 111990632 A | | 11/2020 |
| CN | 112369495 A | * | 2/2021 |
| CN | 112369495 A | | 2/2021 |
| CN | 112616926 A | | 4/2021 |
| CN | 112890203 A | | 6/2021 |

OTHER PUBLICATIONS

Jiang, Zhanmei et al., Effect of Ultrasound on the Structure and Functional Properties of Transglutaminase-Crosslinked Whey Protein Isolate Exposed to Priorheat Treatment, International Dairy Journal, 88: 79-88, 2019.

First Office Action in Chinese Application No. 202110773164.8 dated Dec. 6, 2021, 9 pages.

Decision to Grant a Patent in Chinese Application No. 202110773164.8 dated Feb. 9, 2022, 4 pages.

* cited by examiner

FERMENTED MILK AND PREPARATION METHODS THEREOF

CROSS-REFERENCE TO RELATED APPLICATIONS

This application claims priority to Chinese Patent Application No. 202110773164.8, filed on Jul. 8, 2021, the contents of which are hereby incorporated by reference.

TECHNICAL FIELD

The present disclosure relates to the field of biotechnology and, in particular, to a fermented milk prepared using an extruded whey protein isolate (WPI)-inulin composition and a method for its preparation.

BACKGROUND

Fermented milk enjoys widespread popularity among consumers worldwide as a fermented product with high nutritional value. Factors that influence consumer acceptance of a fermented milk product include the texture of the milk, to which properties such as hardness, water retention, and viscosity are critical. Also, the texture of fermented milk is affected when whey separation occurs. A good technique to reduce whey separation in fermented milk is to add ingredients such as whey protein and inulin to develop a rather firm texture.

Whey protein is widely used in food processing as an emulsifier, a thickener, and a gelling agent with diverse functional properties. Inulin, a functional plant polysaccharide, is often used as a prebiotic, substitute for sugar and fat, thickener, etc. with its various physiological functions, such as lowering blood sugar and regulating intestinal microflora. Therefore, it is desired to develop a method for preparing fermented milk with improved quality using whey protein and inulin.

SUMMARY

One aspect of the present disclosure provides a fermented milk. The fermented milk is prepared by adding an extruded whey protein isolate (WPI)-inulin composition to a raw milk.

A further aspect of the present disclosure provides a method for preparing the fermented milk. In some embodiments, the method for preparing the fermented milk includes:

step 1, preparing the extruded WPI-inulin composition by mixing inulin with whey protein extruded at a low temperature;

step 2, adding sucrose and the extruded WPI-inulin composition into the raw milk, and uniformly mixing and stirring the sucrose, the extruded WPI-inulin composition, and the raw milk to obtain a material A;

step 3, preheating, homogenizing, sterilizing, and cooling the material A to obtain a fermentation substrate;

step 4, adding a fermentation agent into the fermentation substrate, filling the fermentation substrate in a container, and then performing heat-preserved fermentation, and ending the fermentation to obtain a material B; and step 5, cooling the material B, and then refrigerating the material B to obtain fermented milk;

A further aspect of the present disclosure provides an extruded WPI-inulin composition for preparing fermented milk, characterized in that the inulin described in the composition accounts for 5 percent (%) to 20% of a total amount of the extruded whey protein.

A further aspect of the present disclosure provides a method for preparing the extruded WPI-inulin composition, comprising:

S1, carrying out an extrusion pretreatment on whey protein at a low temperature to obtain extruded whey protein, then freeze-drying the extruded whey protein, and grinding the freeze-dried extruded whey protein into powder; and S2, dissolving powdered whey protein and inulin in deionized water at room temperature to obtain the extruded WPI-inulin composition after stirring.

Additional features will be set forth in part in the description which follows, and in part will become apparent to those skilled in the art upon examination of the following and the accompanying drawings or may be learned by production or operation of the embodiments. The features of the present disclosure may be realized and attained by practice or use of various aspects of the methodologies, instrumentalities, and combinations set forth in the detailed embodiments discussed below.

BRIEF DESCRIPTION OF THE DRAWINGS

The present disclosure is further described in terms of exemplary embodiments. These exemplary embodiments are described in detail with reference to the drawings. It should be noted that the drawings are not to scale. These embodiments are non-limiting exemplary embodiments, in which like reference numerals represent similar structures throughout the several views of the drawings, and wherein.

DETAILED DESCRIPTION

Figure 1:
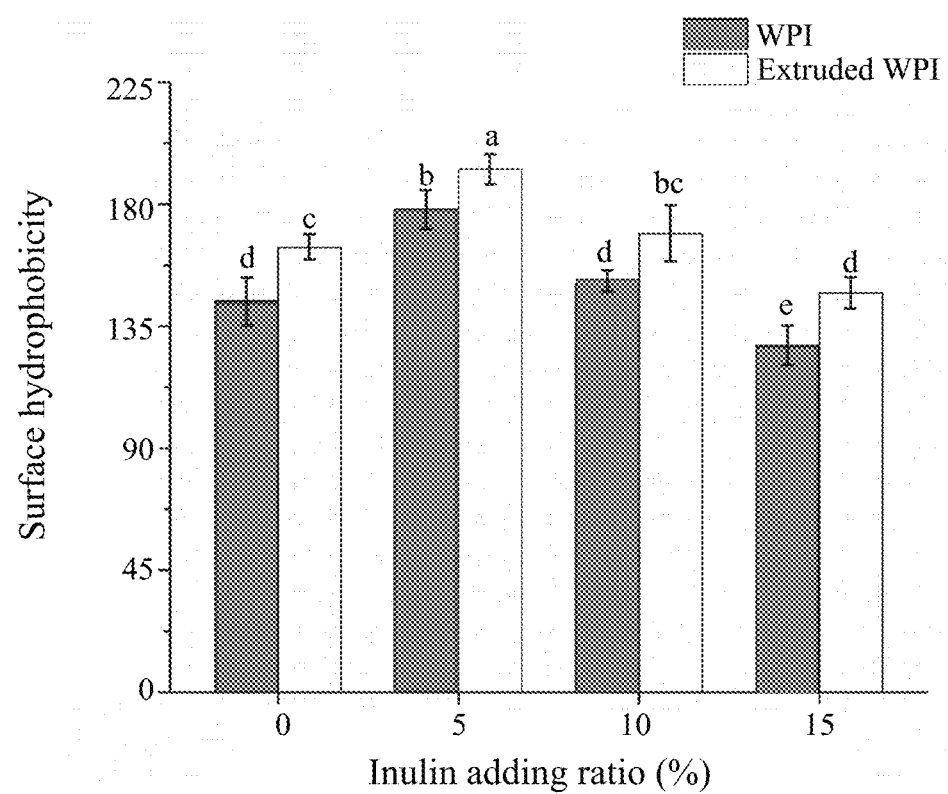
FIG. 1 shows an analytical diagram illustrating the effect of different inulin adding ratios on the surface hydrophobicity of the extruded whey protein isolate (WPI) in the composition.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is to describe particular exemplary embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the method of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The term "about" and its grammatical equivalents in relation to a reference numerical value and its grammatical equivalents as used herein may include a range of values plus or minus 10 percent (%) from that value, such as a range of values plus or minus 10%, 9%, 8%, 7%, 6%, 5%, 4%, 3%, 2%, or 1% from that value. For example, the amount "about 10" includes amounts from 9 to 11.

One aspect of the present disclosure provides a method for preparing a fermented milk; in some embodiments, the method for preparing the fermented milk includes adding an extruded whey protein isolate (WPI)-inulin composition in a process of preparing the fermented milk.

After extrusion pretreatment, the secondary and tertiary structures of the whey protein are changed, promoting the unfolding of the protein molecules and improving their functional properties such as water retention and viscosity, thus further enabling the extruded WPI-inulin composition to improve the texture of the fermented milk; the method of preparation, in particular, significantly improves and enhances the quality properties such as hardness, adhesion, water retention and viscosity of the fermented milk. It also improves the organoleptic acceptability of the fermented milk, promotes the growth and metabolism of lactic acid bacteria, and maintains a high level of viable lactic acid bacteria in the fermented milk over a period of storage (e.g. less than fourteen days). The fermented milk prepared by this method may meet the needs of a wide range of consumers and has a broad market potential.

In some embodiments, the method of preparation may include:

step 1, preparing the extruded WPI-inulin composition by mixing inulin with a whey protein extruded at a low temperature;

step 2, adding sucrose and the extruded WPI-inulin composition into a raw milk, and uniformly mixing and stirring the sucrose, the extruded WPI-inulin composition, and the raw milk to obtain a material A;

step 3, preheating, homogenizing, sterilizing, and cooling the material A to obtain a fermentation substrate;

step 4, adding a fermentation agent into the fermentation substrate, filling the fermentation substrate in a container, and then performing heat-preserved fermentation, and ending the fermentation to obtain a material B; and step 5, cooling the material B to obtain fermented milk;

In some embodiments, preparing the extruded WPI-inulin composition in step 1 may specifically include:

S1, carrying out an extrusion pretreatment on whey protein at a low temperature to obtain extruded whey protein, then freeze-drying the extruded whey protein, and grinding the freeze-dried extruded whey protein into powder; and S2, dissolving powdered whey protein and inulin in deionized water to obtain the extruded WPI-inulin composition after mixing and stirring.

In some embodiments, step S2 may further include dissolving powdered whey protein and inulin in deionized water at room temperature to obtain a composition solution after stirring, then freeze-drying the composition solution to obtain the extruded WPI-inulin composition.

In some embodiments, step S2 may include grinding the freeze-dried composition into powder to obtain the extruded WPI-inulin composition.

In some embodiments, step S2 may adopt other drying methods other than freeze-drying, such as ambient air drying, reduced pressure drying, etc., which are not limited by the present disclosure.

In some embodiments, the inulin described in step S2 may be added at about 5% to 20% of the total amount of inulin and extruded whey protein. For example, inulin is added at about 5%, 10%, 15%, or 20% of the total amount of inulin and extruded whey protein. In some embodiments, inulin is added to increase the surface hydrophobicity of the extruded whey protein, as well as to improve the emulsifying activity and emulsion stability of the extruded whey protein. In some embodiments, inulin is added to improve the foaming characteristics, water retention, and viscosity of the extruded whey protein.

In some embodiments, in step 2, a mass to volume ratio of the extruded WPI-inulin composition to the raw milk is in a range of (1.0-3.5): 100. For instance, the mass to volume ratio of the extruded WPI-inulin composition to the raw milk may be 1:100, 2:100, 3.5:100, etc. By adding the extruded WPI-inulin composition, the hardness, adhesion, water retention and viscosity of the fermented milk may be improved and enhanced.

In some embodiments, the hardness value of the fermented milk containing the extruded WPI-inulin composition prepared by the present disclosure is increased by a factor of about 3.6, i.e., from 16.44 gram (g) to 59.37 g. The absolute value of adhesion is increased by a factor of about 4.0, i.e., from |-78.07| to |-310.96|, as compared to the fermented milk not treated by the presently disclosed technology. The water retention is increased from 50.16% to 69.34%, which is an increase of about 1.4 times. The viscosity index increased from 0.92 Pascal·second (Pa·sn) to 42.60 Pa·sn, an increase of about 46.3 times.

In some embodiments, the growth and propagation of lactic acid bacteria may be promoted by adding extruded WPI-inulin composition during the production of fermented milk. For example, the lactic acid bacteria may include *Bifidobacterium youthfulum, Bifidobacterium animalis (Bifidobacterium lactis), Bifidobacterium bifidum, Bifidobacterium shortum, Lactobacillus acidophilus, Lactobacillus casei, Lactobacillus delbrueckii* subsp. *Bulgaricus, Lactobacillus delbrueckii* subsp. *Lactis, Lactobacillus fermentum, Lactobacillus paracasei, Lactobacillus plantarum, Lactobacillus reuteri, Lactobacillus rhamnosus* and *Streptococcus thermophilus*. Compared with the fermented milk not treated with the presently disclosed technology, the count of viable bacteria of the fermented milk lactic acid bacteria containing extruded WPI-inulin composition prepared by the present disclosure is increased by 71.43%.

In some embodiments, by adding extruded WPI-inulin composition during the production of fermented milk, the rate at which the count of viable lactic acid bacteria in the fermented milk decreases with storage duration may be slowed down, thereby allowing the content of probiotic in the fermented milk to be maintained at a high level, which is beneficial to human body. For example, when the storage duration is 7 days, the count of viable lactic acid bacteria in the fermented milk does not show a significant decrease; also, when the storage duration is 14 days, the count of viable lactic acid bacteria in fermented milk remains high ($\geq 10^7$); moreover, when the storage time is 14 days, due to the extruded WPI-inulin composition, more than 80% or 85% of the initial level of the amount of viable bacteria of the *Lactobacillus bulgaricus* may be maintained in the fermented milk.

In some embodiments, the mass to volume ratio of the sucrose to the raw milk may be in a range of (1-9): 100. For instance, the mass to volume ratio of sucrose to the raw milk may be 1:100, 3:100, 7:100, 9:100, etc. In some embodiments, the amount of the sucrose may be adjusted according to the needs of the fermentation production, which is not limited by the present disclosure.

In some embodiments, the stirring in the step S2 may be performed for 15-30 min. e.g., the stirring may be performed for 15 min, 20 min, 30 min, etc. In some embodiments, the stirring may be adjusted according to the amount of raw milk and WPI-inulin composition.

In some embodiments, in step 3, the preheating may be performed at a temperature of 50-65 degree Celsius (° C.) for a duration of 5-10 min.

In some embodiments, the homogenizing may be performed at a pressure of 15-25 Megapascal (MPa), such as 15 MPa, 20 MPa, 25 MPa, etc.

In some embodiments, the sterilizing may be pasteurization under a temperature of 90-95° C. for a duration of 10-15 min.

In some embodiments, the fermentation substrate may be cooled to 40-42° C. in step S3. In some embodiments, the fermentation substrate may be cooled to a temperature required for fermentation.

In some embodiments, in step 4, a fermenting agent with a mass to volume ratio of 0.41 per thousand (‰) may be added to the fermentation substrate according to mass to volume ratio.

In some embodiments, the heat-preserved fermentation may be performed at a temperature of 40-42° C. for 4.5-6.0 hours (h).

In some embodiments, in step 5, material B may be cooled to 20-35° C. and then refrigerated at 4° C. for 24 h.

In some embodiments, the extrusion pretreatment may comprise extruding the whey protein at a low temperature using an extruder to obtain the extruded whey protein. In some embodiments, the temperature in the extrusion pretreatment may be controlled to be between 45-55° C. For example, the temperature inside the extruder and/or at the discharge port of the extruder may be controlled between 45-55° C. In some embodiments, the extruder may be provided with a water inlet. Whey protein isolate (e.g., in powder form) may be placed into the extruder (also known as feeding) at a certain rate and water may be fed at a certain rate such that the whey protein and water are mixed inside the extruder. For example, the mixture may have a moisture content of 30%-50%, e.g., 40%. In some embodiments, the extruder may be a screw extruder. By way of example only, the screw extruder may have a speed of 200-400 revolutions per minute (r/min, rpm/min), e.g. 240 r/min. The feeding into the screw extruder may be performed in a rate of 9-13 g/min, e.g. 11 g/min.

An aspect of the present disclosure also provides a fermented milk prepared using an extruded WPI-inulin composition. In some embodiments, the fermented milk is also referred to as fermented milk containing an extruded WPI-inulin composition. In some embodiments, the fermented milk may be produced using the aforementioned preparation method. In some embodiments, the extruded WPI-inulin composition improves the quality characteristics of the fermented milk such as hardness, adhesion, water retention and viscosity. The preparation method may also improve the sensory acceptability of the fermented milk, promote the growth and metabolism of lactic acid bacteria, and maintain a high level of viable lactic acid bacteria in the fermented milk after a period of storage (e.g., less than fourteen days).

A further aspect of the present disclosure also provides an extruded WPI-inulin composition for preparing the fermented milk. In the composition, the inulin constitutes 5%-20% of the total amount of inulin and extruded whey protein.

In some embodiments, the extruded WPI-inulin composition may be a solid, such as a powder, a block, a tablet, etc. In some embodiments, the extruded WPI-inulin composition may be an aqueous solution.

In some embodiments, the WPI-inulin composition may be in the form of a powder that has been freeze-dried for ease of preservation and use.

Another aspect of the present disclosure also provides a method of preparing the extruded WPI-inulin composition for preparing the fermented milk. In some embodiments, the method comprises:

S1, carrying out extrusion pretreatment on whey protein at a low temperature to obtain extruded whey protein, then freeze-drying the extruded whey protein, and grinding the freeze-dried extruded whey protein into powder; and S2, dissolving powdered whey protein and inulin in deionized water to obtain a the extruded WPI-inulin composition after mixing and stirring.

More details on the preparation method of extruded WPI-inulin composition may be found in the previous article and will not be repeated here.

The present disclosure discloses at least the following technical effects:

(1) the whey protein added in this disclosure is pretreated by extrusion, which improves the functional characteristics such as water retention and viscosity of the protein, and greatly improves the hardness, adhesion, water retention, viscosity and other characteristics of the fermented milk in combination with extruded whey protein and inulin; and (2) the fermented milk containing extruded WPI-inulin composition prepared by this disclosure has good stability, high quality, delicate taste, moderate sweet and sour, and good tissue state and fermented milk flavor in terms of sensory quality, which indicates that inulin compounded with extruded whey protein in fermented milk is a good choice for developing functional fermented milk; compared with the fermented milk not treated by this disclosed technology, the count of viable lactic acid bacteria in the fermented milk containing extruded WPI-inulin composition prepared by this disclosure is increased by 71.43%; moreover, the count of viable lactic acid bacteria remains at a rather high level ($\geq 10^7$) with the extension of storage duration; accordingly, the fermented milk prepared by the present disclosure has a broad market prospect as it may meet the needs of the majority of consumers.

Various exemplary embodiments of this disclosure are now described in detail, and such detailed description should not be considered a limitation of this disclosure, but should be understood to be a rather detailed description of certain aspects, features, and embodiments of this disclosure.

Embodiment 1

A method for preparing fermented milk containing an extruded WPI-inulin composition, including:

(1) preparation of the extruded WPI-inulin composition: pretreating a whey protein by extrusion at an extrusion temperature of 45° C., freeze-drying the extruded whey protein, grinding the freeze-died extruded whey protein into powder, compounding the powdered extruded whey protein with 5% adding ratio (g/g, a ratio of inulin/total solid mass of extruded whey protein and inulin) of inulin by dissolving in deionized water at room temperature, magnetically stirring the compounded extruded whey protein and inulin for 2 h to obtain a composition solution, freeze-drying the composition solution and grinding it into powder to obtain the extruded WPI-inulin composition;

(2) adding 1% by mass of extruded WPI-inulin composition (i.e., the mass-volume ratio of extruded WPI-inulin composition to raw milk is 1 g:100 milliliters (mL)), 3% sucrose (i.e., the mass-volume ratio of sucrose to raw milk is 3 g:100 mL) to raw milk, followed by mixing well for 15 min to obtain material A;

(3) preheating material A at 50° C. for 5 min, then homogenizing the material A at 15 MPa, then pasteurizing the material A at 90° C. for 10 min, and finally cooling the pasteurized material A to 40° C. to obtain a fermentation substrate;

(4) adding 0.35‰ (weight by volume, w/v) of a fermenting agent to the fermentation substrate (i.e., the mass-volume ratio of fermenting agent to fermentation substrate is 0.35 g:1,000 mL), then filling the fermentation substrate, and performing heat-preserved fermentation at 40° C. for 1.5 h, then ending the fermentation to obtain a material B; and (5) cooling the material B to 20° C., and then refrigerating the material B at 4° C. for 24 h to obtain fermented milk.

Embodiment 2

A method for preparing fermented milk containing an extruded WPI-inulin composition, including:

(1) preparation of the extruded WPI-inulin composition: pretreating a whey protein by extrusion at an extrusion temperature of 50° C., freeze-drying the extruded whey protein, grinding the freeze-died extruded whey protein into powder, compounding the powdered extruded whey protein with 15% adding ratio (g/g, a ratio of inulin/total solid mass of extruded whey protein and inulin) of inulin by dissolving in deionized water at room temperature, magnetically stirring the compounded extruded whey protein and inulin for 2 h to obtain a composition solution, freeze-drying the composition solution and grinding it into powder to obtain the extruded WPI-inulin composition;

(2) adding 2% by mass of extruded WPI-inulin composition (i.e., the mass-volume ratio of extruded WPI-inulin composition to raw milk is 2 g:100 mL), 7% sucrose (i.e., the mass-volume ratio of sucrose to raw milk is 7 g:100 mL) to raw milk, followed by mixing well for 20 min to obtain material A;

(3) preheating material A at 55° C. for 5 min, then homogenizing the material A at 20 MPa, then pasteurizing the material A at 93° C. for 12 min, and finally cooling the pasteurized material A to 42° C. to obtain a fermentation substrate;

(4) adding 0.41‰ (w/v) of a fermenting agent to the fermentation substrate (i.e., the mass-volume ratio of fermenting agent to fermentation substrate is 0.41 g:1,000 mL), then filling the fermentation substrate, and performing heat-preserved fermentation at 42° C. for 5.5 h, then ending the fermentation to obtain a material B; and (5) cooling the material B to 30° C., and then refrigerating the material B at 4° C. for 24 h to obtain fermented milk.

Embodiment 3

A method for preparing fermented milk containing an extruded WPI-inulin composition, including:

(1) preparation of the extruded WPI-inulin composition: pretreating a whey protein by extrusion at an extrusion temperature of 55° C., freeze-drying the extruded whey protein, grinding the freeze-died extruded whey protein into powder, compounding the powdered extruded whey protein with 20% adding ratio (g/g, a ratio of inulin/total solid mass of extruded whey protein and inulin) of inulin by dissolving in deionized water at room temperature, magnetically stirring the compounded extruded whey protein and inulin for 2 h to obtain a composition solution, freeze-drying the composition solution and grinding it into powder to obtain the extruded WPI-inulin composition;

(2) adding 3.5% by mass of extruded WPI-inulin composition (i.e., the mass-volume ratio of extruded WPI-inulin composition to raw milk is 3.5 g:100 mL), 9% sucrose (i.e., the mass-volume ratio of sucrose to raw milk is 9 g:100 mL) to raw milk, followed by mixing well for 20 min to obtain material A;

(3) preheating material A at 65° C. for 10 min, then homogenizing the material A at 25 MPa, then pasteurizing the material A at 95° C. for 15 min, and finally cooling the pasteurized material A to 42° C. to obtain a fermentation substrate;

(4) adding 0.45‰ (w/v) of a fermenting agent to the fermentation substrate (i.e., the mass-volume ratio of fermenting agent to fermentation substrate is 0.45 g:1,000 mL), then filling the fermentation substrate, and performing heat-preserved fermentation at 42° C. for 6 h, then ending the fermentation to obtain a material B; and (5) cooling the material B to 35° C., and then refrigerating the material B at 4° C. for 24 h to obtain fermented milk.

Embodiment 4

1) the effect of different inulin adding ratios on the surface hydrophobicity of extruded WPI according to the preparation method of Embodiment 2 was compared;

2) surface hydrophobicity was measured as follows:

the protein samples were diluted to 0.2-1.0 mg/mL with phosphate buffer solution (pH of 7.0, concentration of 0.01 mole/liter (mol/L)), and 20 μL of 8-anilino-1-naphthalene-sulfonic acid (ANS) solution (concentration of 8 millimole/liter (mmol/L)) was added to 4 mL of the diluted protein samples, followed by mixing with shaking and reacting in the dark for 15 min; an excitation wavelength was set to 390 nm, and an emission wavelength was set to 470 nm and a slit width was set to 5 nm, and a fluorescence intensity was measured, then a linear regression analysis was performed with the measured fluorescence intensity as a vertical coordinate and the protein concentration as a horizontal coordinate to obtain an initial slope, and the initial slope was used as the surface hydrophobicity of the protein samples;

inulin was added to the WPI after extrusion pretreatment at 50° C., and the effect of different inulin adding ratios (0%, 5%, 10%, 15%, g/g, ratio of inulin/total solid mass of extruded WPI and inulin) on the surface hydrophobicity of extruded WPI and WPI of the control group was investigated.

As shown in FIG. 1, the surface hydrophobicity of both extruded WPI and WPI increased when 5% inulin was added, and increased by 17.48% and 23.48%, respectively, compared with those without addition of inulin; however, the surface hydrophobicity gradually decreased with the increase of the percentage of inulin adding ratio (5-15%). In general, the extruded WPI has rather high surface hydrophobicity, which is due to the fact that during extrusion, some of the hydrophobic amino acids inside the protein are exposed under high pressure and high shear stress, resulting in increased hydrophobicity of the protein surface.

Embodiment 5

1) the effect of different inulin adding ratios on the emulsifying characteristics of extruded WPI according to the preparation method of Embodiment 2 was compared;

2) the emulsifying characteristics are measured as follows:

the emulsifying characteristics of protein samples were determined according to the turbidimetric method of Pearce and Kinsella; firstly, 3 mL of 0.5 mg/mL protein sample solution and 1 mL of soybean oil were mixed together and then homogenized and emulsified using a high-speed emulsifier at 10,000 rpm for 2 min; then, 50 microliters (μL) of the emulsion was aspirated from the bottom of the tube and left for 0 min and 10 min, respectively, and immediately mixed with 5 mL of 0.1% SDS solution, and the absorbance was recorded at 500 nm; the 0.1% SDS solution was used as a reagent blank; and the emulsifying activity (EAI, m²/g) was calculated using the following Equation (1):

$$EAI(m^2/g) = \frac{2T \times (A_0 \times D)}{(1-\varphi) \times C \times 10}, \qquad (1)$$

where $A_0$ denotes the absorbance measured after the emulsion was left for 0 min, D denotes the dilution multiple of 100, φ denotes the volume fraction of the oil phase of the emulsion of 0.25, C denotes the concentration (mg/mL) of the protein solution before emulsification, and T denotes the turbidity of 2.303.

Figure 2:
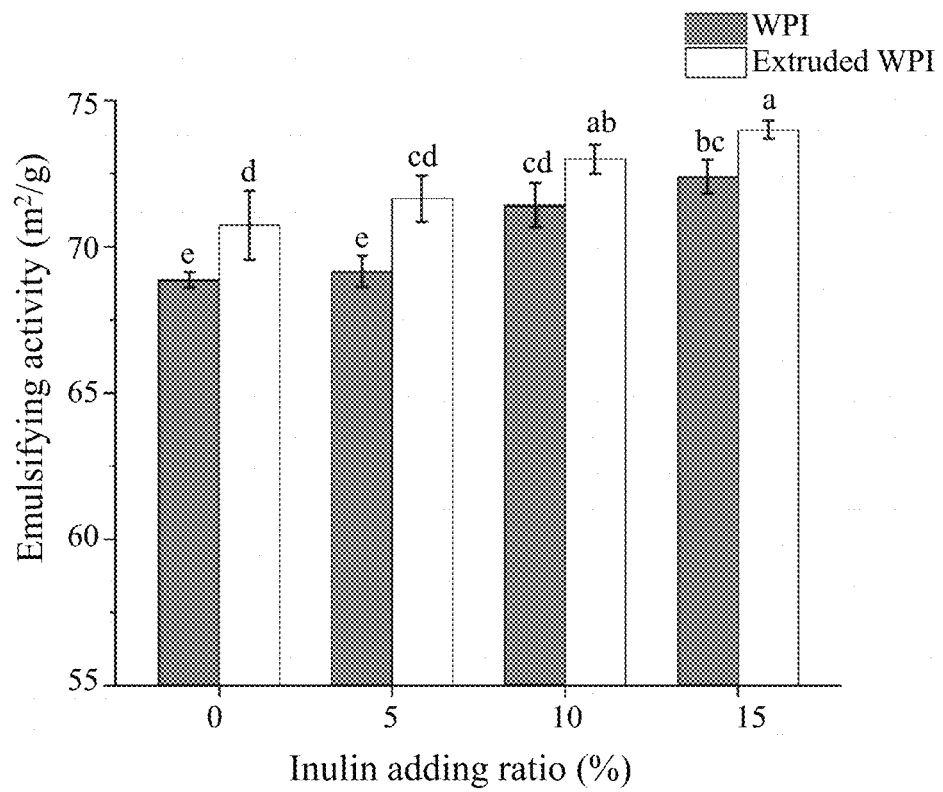
FIG. 2 shows an analytical diagram illustrating the effect of different inulin adding ratios on the emulsifying activity of the extruded WPI in the composition.
Figure 3:
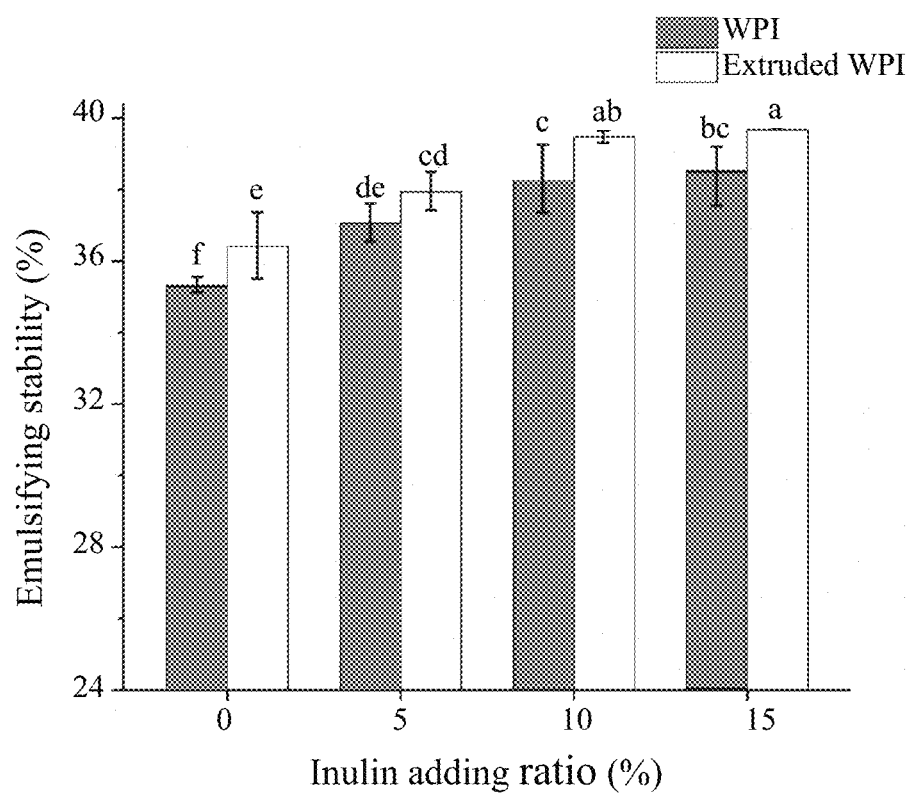
FIG. 3 shows an analytical diagram illustrating the effect of different inulin adding ratios on the emulsifying stability of the extruded WPI in the composition.

Emulsion stability (ESI, %) was calculated using the following Equation (2):

$$ESI(\%) = \frac{A_{10}}{A_0} \times 100\%, \qquad (2)$$

where $A_0$ denotes the absorbance measured after the emulsion was left for 0 min, and $A_{10}$ denotes the absorbance measured after the emulsion was left for 10 min;

inulin was added to the WPI after extrusion pretreatment at 50° C., and the effect of different inulin adding ratios (0%, 5%, 10%, 15%, g/g, ratio of inulin/total solid mass of extruded WPI and inulin) on the emulsifying activity and emulsion stability of extruded WPI and WPI of control group were investigated as shown in FIG. 2 and FIG. 3, respectively.

As may be seen from FIG. 2, the effect of low concentration of inulin on the emulsifying activity of whey protein was not significant, and the emulsifying activity of whey protein increased as the percentage of inulin added increased, but there was no significant difference in the emulsifying activity of whey protein with 10% and 15% inulin added (P>0.05). Compared with the extruded protein without inulin addition, the emulsifying activity of the extruded protein with 15% inulin addition increased by 4.57%. It indicates that the inulin improves the emulsifying activity of the protein and that the emulsifying activities of the extruded whey proteins are higher than that of the unextruded whey proteins with the increase of the percentage of inulin addition.

FIG. 3 shows the effect of inulin on the emulsifying stability of extruded WPI/unextruded WPI. Similar to the results of emulsifying activity, the emulsifying stability of whey protein increases with increasing the percentage of inulin addition. The emulsion stability of extruded whey protein increased by 8.98% when the inulin adding ratio was 15%. This is due to the increased viscosity of the solution as a result of the increased inulin content, which therefore inhibits the mobility of the protein and favors stability.

Embodiment 6

Figure 4:
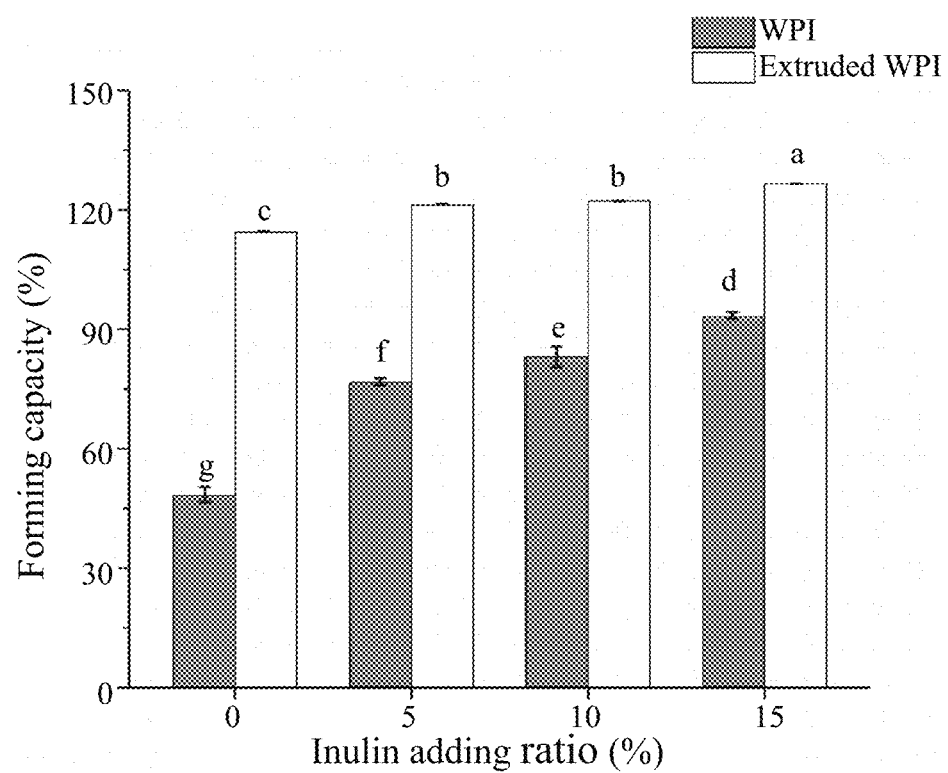
FIG. 4 shows an analytical diagram illustrating the effect of different inulin adding ratios on the foaming capacity of extruded WPI in the composition.
Figure 5:
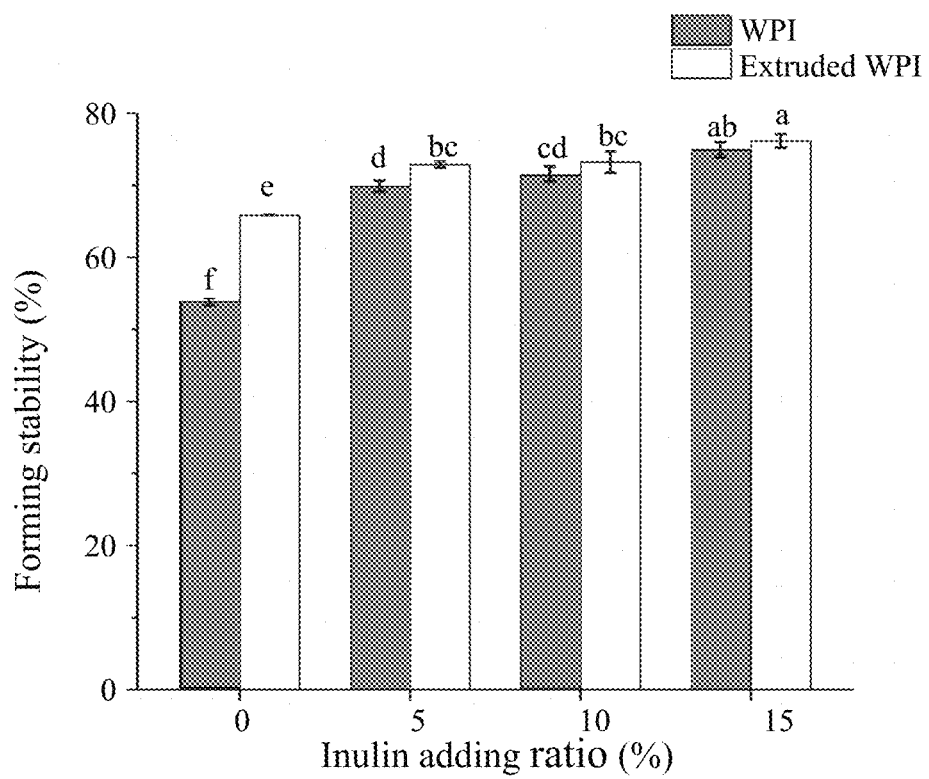
FIG. 5 shows an analytical diagram illustrating the effect of different inulin adding ratios on the foam stability of extruded WPI in the composition.

(1) According to the preparation method of Embodiment 2, the effects of different inulin adding ratios on the foaming characteristics of extruded WPI were compared; and (2) the foaming characteristics were determined as follows:

the foaming capacity and foam stability of the protein samples were determined with appropriate modifications according to the method of Jiang et al, where a 15 mL sample solution (V) at a concentration of 10 mg/mL was added to a 100 mL volume measuring cylinder and then homogenized and emulsified using a high-speed emulsifier (homogenization at 10,000 rpm for 2 min). Immediately after homogenization, the volume of foam ($V_0$) was recorded at 0 min, and the volume of foam (V30) was recorded after letting the mixture stand for 30 min. The foaming capacity and foam stability are calculated using the following Equation (3):

$$\text{Foaming capacity (\%)} = \frac{V_0}{V} \times 100\%, \quad (3)$$

inulin was added to the WPI after extrusion pretreatment at 50° C., and the effect of different inulin adding ratios (0%, 5%, 10%, 15%, g/g, ratio of inulin/total solid mass of extruded WPI and inulin) on the foaming capacity and foam stability of extruded WPI and WPI of control group were investigated as shown in FIG. 4 and FIG. 5, respectively.

It may be seen from FIGS. 4 and 5 that the foaming capacity and foam stability of the proteins both show an increasing trend with the increase of the inulin adding ratio. The foaming capacity and foam stability of the extruded WPI were the largest when the inulin adding ratio was 15%, being 126.57% and 76.17%, respectively; compared with the extruded WPI without inulin addition, the foaming capacity and foam stability of extruded WPI with inulin increased by 8.39% and 15.69%, respectively. This indicates that the inulin is beneficial to improve the foaming characteristics of the protein. In addition, when no inulin was added, the extruded protein had higher foaming capacity and foam stability than the unextruded protein, with an increase of 137.79% and 22.15%, respectively. The extruded protein molecules may diffuse and adsorb to the air-liquid interface faster, and after reaching the interface, they may stretch and rearrange rapidly, and form adsorption films with strong cohesion and viscoelasticity through intermolecular interactions, thus increasing their foaming properties.

Embodiment 7

Figure 6:
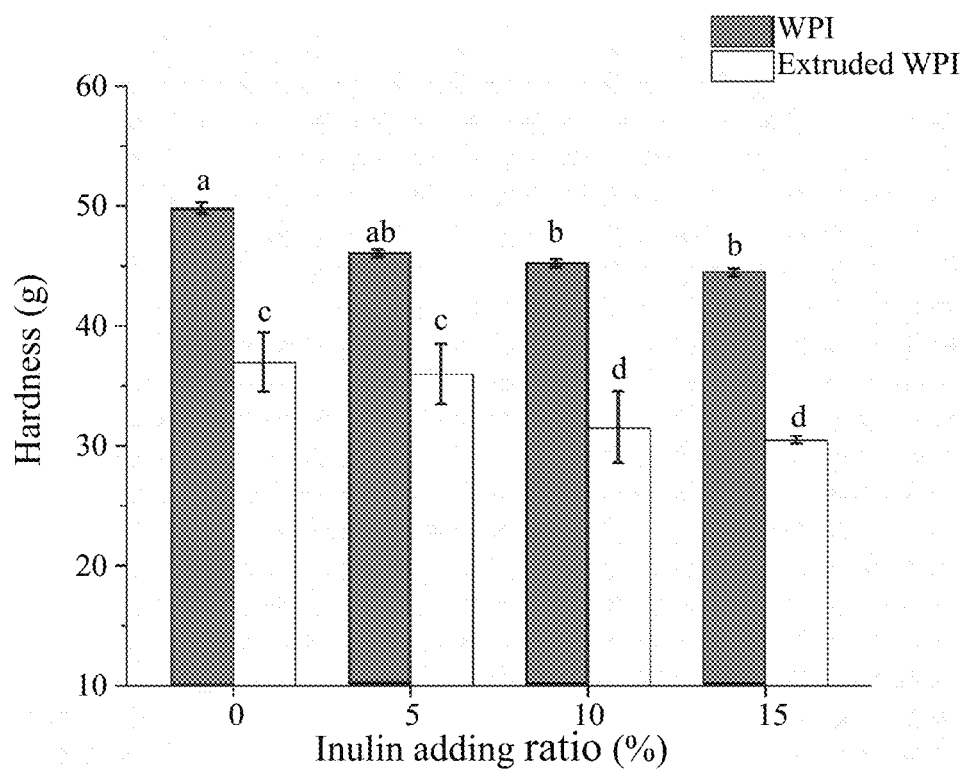
FIG. 6 shows an analytical diagram illustrating the effect of different inulin adding ratios on the gel hardness of the extruded WPI in the composition.
Figure 7:
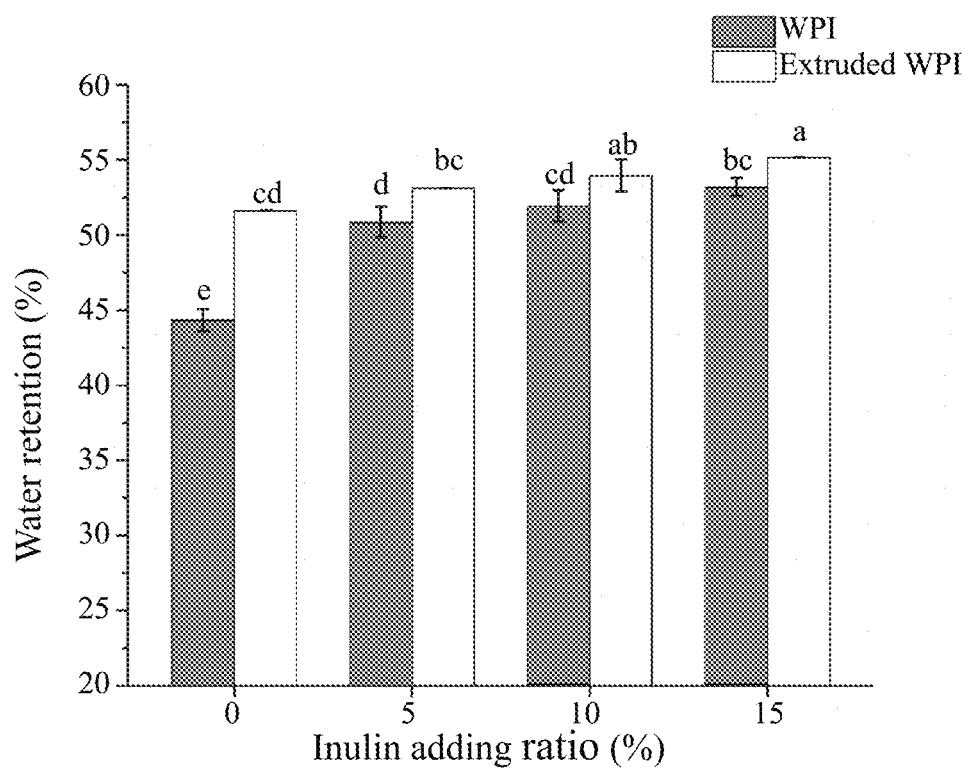
FIG. 7 shows an analytical diagram illustrating the effect of different inulin adding ratios on the water retention of WPI gels pretreated by extrusion in the composition.

1) According to the preparation method of Embodiment 2, the effects of different inulin adding ratios on the gelling characteristics of extruded WPI were compared; and 2) the gelling characteristics are measured as follows:

gelling strength: the samples were prepared into 80 mg/mL protein concentration with deionized water, and then heated in a water bath at 95° C. for 30 min, then the heated samples are rapidly cooled to room temperature at the end of heating, and finally stored at 4° C. for 24 h to form a gel;

The hardness of the obtained sample gels was determined using a TA.XT.plus texture analyzer with a P/0.5S probe, and each set of sample gels was tested three times.

the test parameters were set as follows: pre-test, test, and post-test speeds of 2 mm/s, 1 mm/s, and 1 mm/s respectively, test distance of 5 mm, trigger force of 5 g, and two compression intervals of 5 s;

water retention of gel: small pieces of sample gel were placed in a 50 mL centrifuge tube (M1) and weighed for total weight (M2), then the gel was centrifuged at 4,000 g for 15 min and the supernatant was discarded; the total weight of the centrifuge tube and the residual material was recorded as M3; the water retention of gel was calculated using the following Equation (4):

$$\text{Water retention (\%)} = \left(1 - \frac{M_3 - M_1}{M_2 - M_1}\right) \times 100\%, \quad (4)$$

inulin was added to the WPI after extrusion pretreatment at 50° C., and the effect of different inulin adding ratios (0%, 5%, 10%, 15%, g/g, ratio of inulin/total solid mass of extruded WPI and inulin) on the gel texture and gel water retention of extruded WPI and WPI of control group were investigated as shown in FIG. 6 and FIG. 7, respectively.

As shown in FIG. 6, the hardness of the extruded WPI gel decreased from 36.95 g to 30.46 g when the percentage of inulin addition was increased from 0% to 15%. This indicates that the inulin hinders the connection of the internal structure of the hybrid gel and the interactions in the hybrid gel may easily be disrupted. The extruded WPI has rather low hardness when the inulin adding ratio is the same. In addition, it was seen from FIG. 7 that the trend of gel water retention was opposite to the trend of gel hardness, and when the percentage of inulin addition was increased from 0% to 15%, the gel water retention of extruded WPI increased from 51.61% to 55.16%. This indicates that the inulin increases the water retention but decreases the hardness of the gel, where the gel resembles a 'hydrogel', and the WPI has a more pronounced 'hydrogel' effect after the extrusion pretreatment. In addition, the inulin adhering to the protein surface will bind to water through hydrogen bonds and fill the gaps in the network, improving the water retention of the gel.

Embodiment 8

Figure 8:
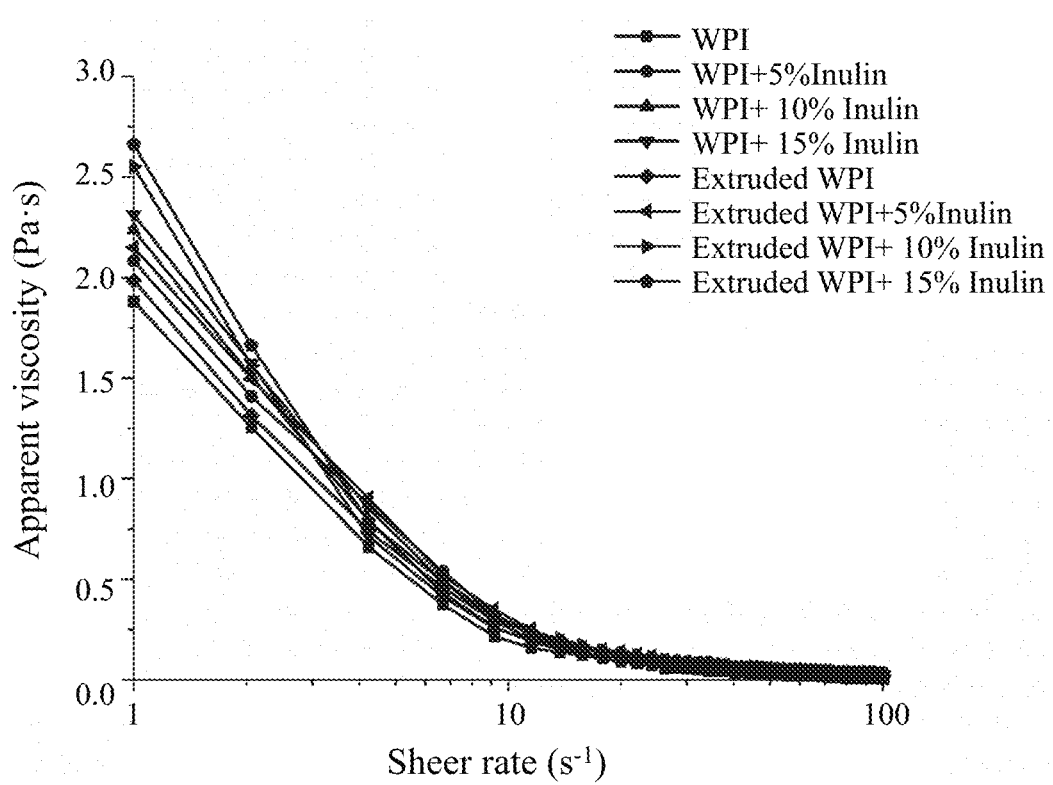
FIG. 8 shows an analytical diagram illustrating the effect of different inulin adding ratios on the apparent viscosity of the extruded WPI in the composition.
Figure 9:
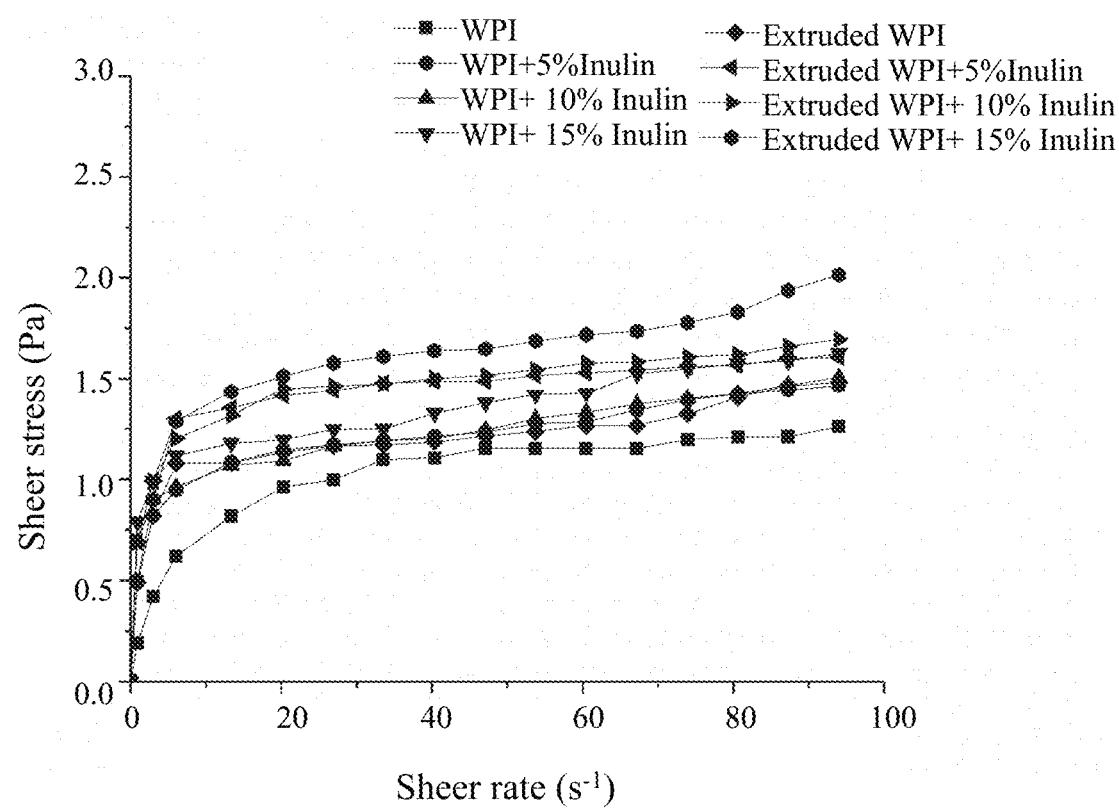
FIG. 9 shows an analytical diagram illustrating the effect of different inulin adding ratios on the shear stress of the extruded WPI in the composition.
Figure 10:
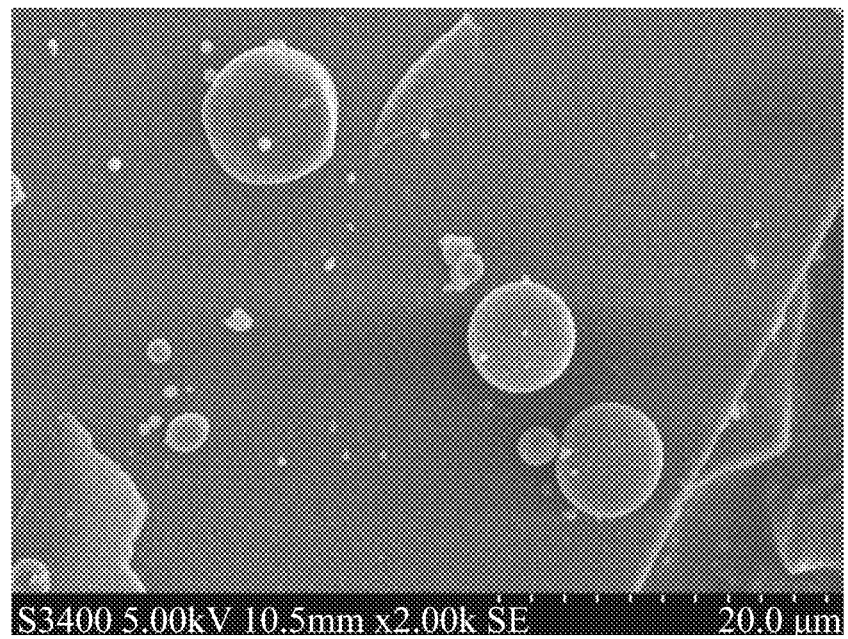
FIG. 10 shows a microstructure of the WPI without extrusion pretreatment and without addition of inulin at a magnification of 5000×.
Figure 11:
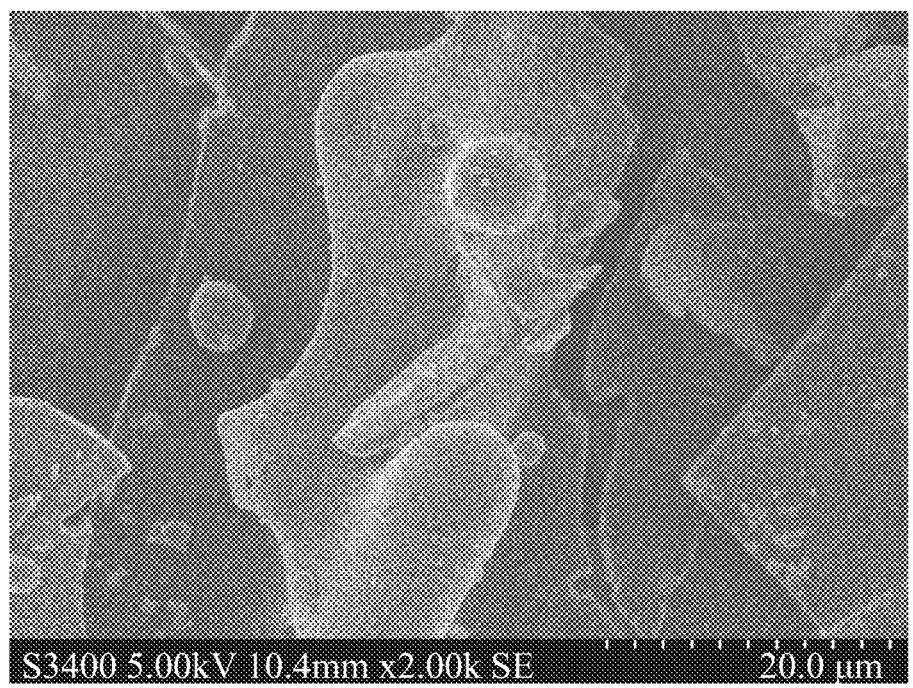
FIG. 11 shows a microstructure of the WPI in the composition with 5 percent (%) inulin while without extrusion pretreatment at a magnification of 5000×.
Figure 12:
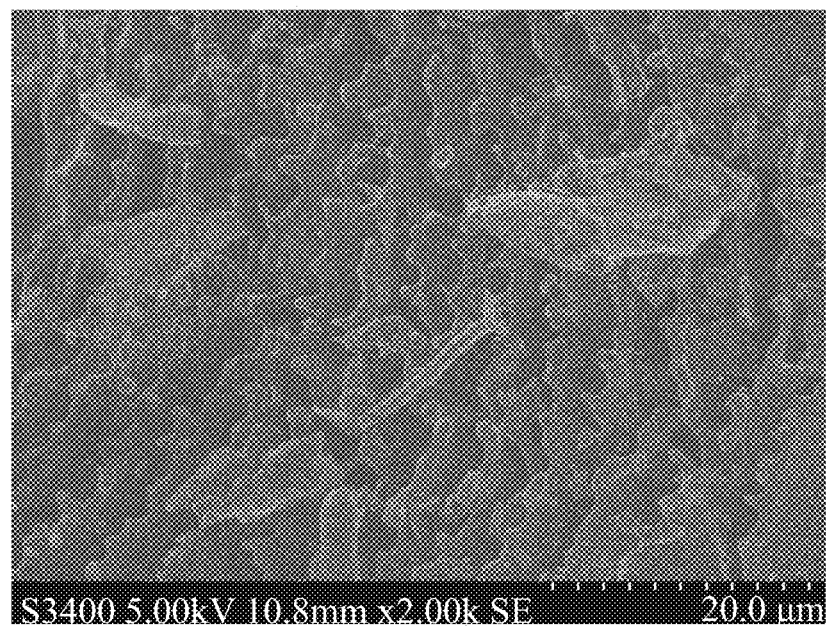
FIG. 12 shows a microstructure of the WPI in the composition with 10% inulin while without extrusion pretreatment at a magnification of 5000×.
Figure 13:
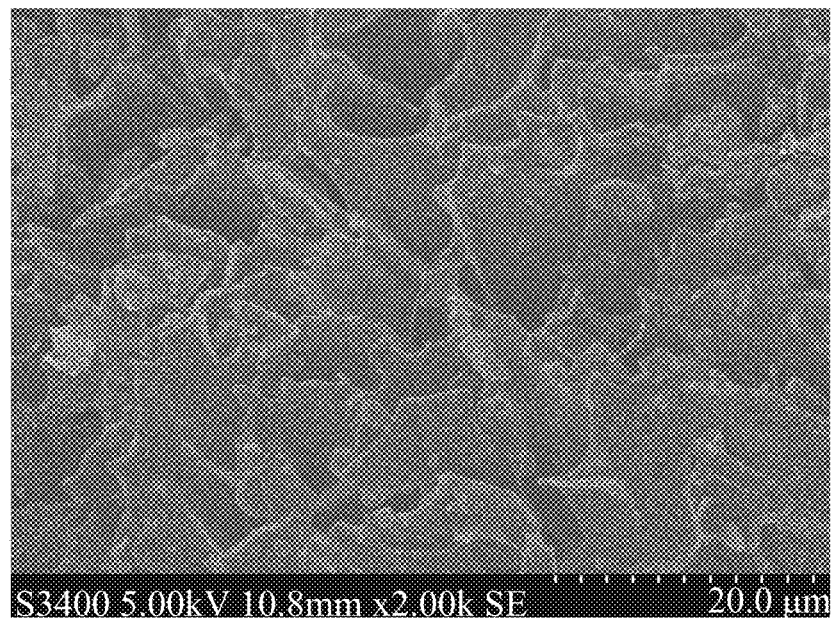
FIG. 13 shows a microstructure of the WPI in the composition with 15% inulin while without extrusion pretreatment at a magnification of 5000×.

(1) According to the preparation method of Embodiment 2, the effect of different inulin adding ratios on the static rheological properties of extruded WPI was compared; and (2) the static rheological properties are determined as follows:

the protein compositions with different inulin adding ratios were dissolved in deionized water to obtain a sample solution with a protein concentration of 40 mg/mL, and the rheology was determined using an RST rheometer; the temperature was controlled at 25° C. and the shear rate was in the range of 0.1-100 s$^{-1}$ during the determination, and the values of shear stress and apparent viscosity were recorded; the Power Law model was used to represent the flow behavior of the samples; a log shear stress to log shear rate curve was made and linearly fitted, and then the flow behavior index n and the viscosity index K were obtained according to the following Equation (5), both of which were used as validation parameters for the viscosity change of the sample.

$$\log \tau = \log K + n \log \gamma, \quad (5)$$

where τ denotes the shear stress (Pa), K denotes the viscosity index (Pa·sn), γ denotes the shear rate (s$^{-1}$), and n denotes the flow behavior index;

inulin was added to the WPI after extrusion pretreatment at 50° C., and the effect of different inulin adding ratios (0%, 5%, 10%, 15%, g/g, ratio of inulin/total solid mass of extruded WPI and inulin) on the static rheological properties of extruded WPI and WPI of control group were investigated as shown in FIG. 8, FIG. 9 and Table 1.

As may be seen from FIG. 8, the apparent viscosity of all samples decreases with increasing shear rate. This indicates that the samples are shear diluted and are pseudoplastic fluids. The increase in shear rate causes the disruption of the network structure of the samples, thus decreasing the viscosity. With the addition of inulin, the samples show higher apparent viscosity and it increases with the increase of the addition ratio. The extruded WPI had the highest apparent viscosity when 15% of inulin was added. This may be due to the fact that the composition formed by the interaction between inulin and protein affected the apparent viscosity of the protein.

The variation of the viscosity index K and the flow behavior index n obtained by fitting according to the power law model (FIG. 9) is shown in Table 1, from which it may be seen that the n values of all samples are less than 1, which proves that the samples belong to pseudoplastic fluids. Moreover, the larger the value of viscosity index K and the smaller the value of flow behavior index n, which means the worse the fluidity and the higher the viscosity of the samples. Therefore, the value of the viscosity index K increased significantly (P<0.05) with the increase of the percentage of inulin addition, indicating that the addition of inulin had increased the viscosity of the protein, and the viscosity index exhibited a similar trend to the apparent viscosity; similarly, the viscosity coefficient K values of extruded WPI were significantly higher than those of unextruded WPI, indicating that extrusion pretreatment also increased the viscosity of the protein.

TABLE 1

Effect of different inulin adding ratios on the viscosity index and flow behavior index of extruded WPI

| Samples | Viscosity index K (Pa·s$^n$) | Flow behavior index n | R$^2$ |
|---|---|---|---|
| WPI | 3.15 ± 0.07$^g$ | 0.41 ± 0.03$^a$ | 0.89 |
| Extruded WPI | 5.47 ± 0.14$^{ef}$ | 0.31 ± 0.00$^b$ | 0.84 |
| WPI + 5% inulin | 5.28 ± 0.07$^f$ | 0.31 ± 0.01$^b$ | 0.85 |
| extruded WPI + 5% inulin | 8.17 ± 0.14$^c$ | 0.17 ± 0.00$^d$ | 0.83 |
| WPI + 10% inulin | 5.66 ± 0.01$^e$ | 0.31 ± 0.00$^b$ | 0.80 |
| extruded WPI + 10% inulin | 8.43 ± 0.07$^b$ | 0.17 ± 0.01$^d$ | 0.77 |
| WPI + 15% inulin | 6.82 ± 0.07$^d$ | 0.21 ± 0.00$^c$ | 0.75 |
| extruded WPI + 15% inulin | 9.02 ± 0.08$^a$ | 0.12 ± 0.01$^e$ | 0.84 |

Note:
same lowercase letter in the same column in the table means the difference is not significant (P > 0.05), different lowercase letter means the difference is significant (P < 0.05).

Embodiment 9

1) According to the preparation method of Embodiment 2, the effects of different inulin adding ratios on the microstructure of extruded WPI were compared; and 2) the microstructure is determined as follows:

the changes in the microstructure of the protein samples were observed at an accelerating voltage of 5 kV using a tungsten filament scanning electron microscope at 2000×. Prior to the observation, the protein samples were gold plated using an ion sputterer. The specific experimental results are shown in FIGS. 10-17.

Figure 14:
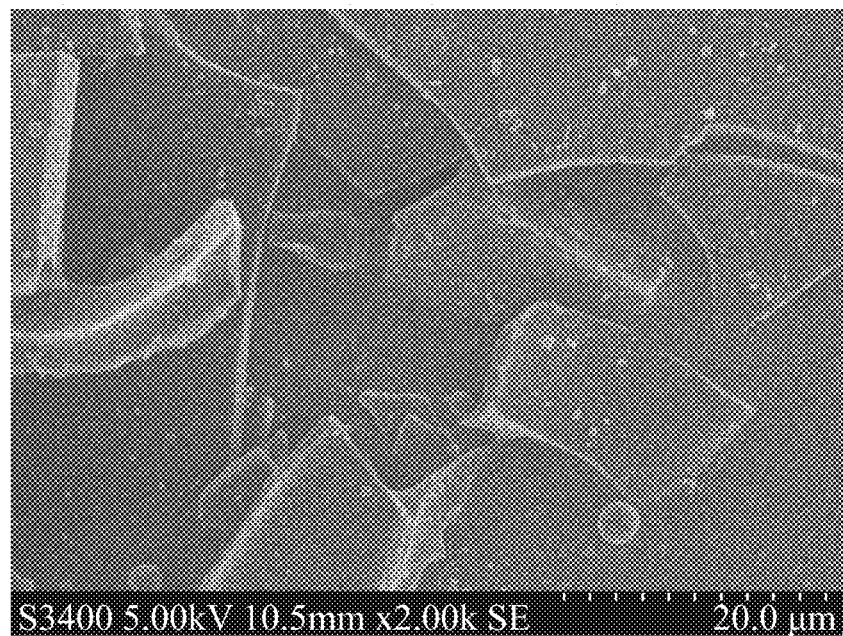
FIG. 14 shows a microstructure of the extruded WPI in the composition without adding inulin at a magnification of 5000×.
Figure 15:
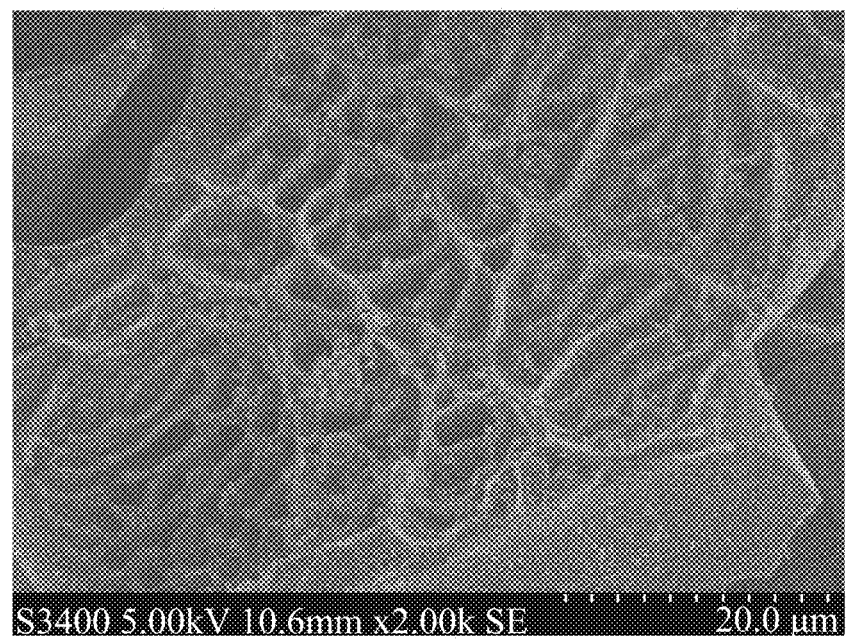
FIG. 15 shows a microstructure of the extruded WPI in the composition with 5% inulin at a magnification of 5000×.
Figure 16:
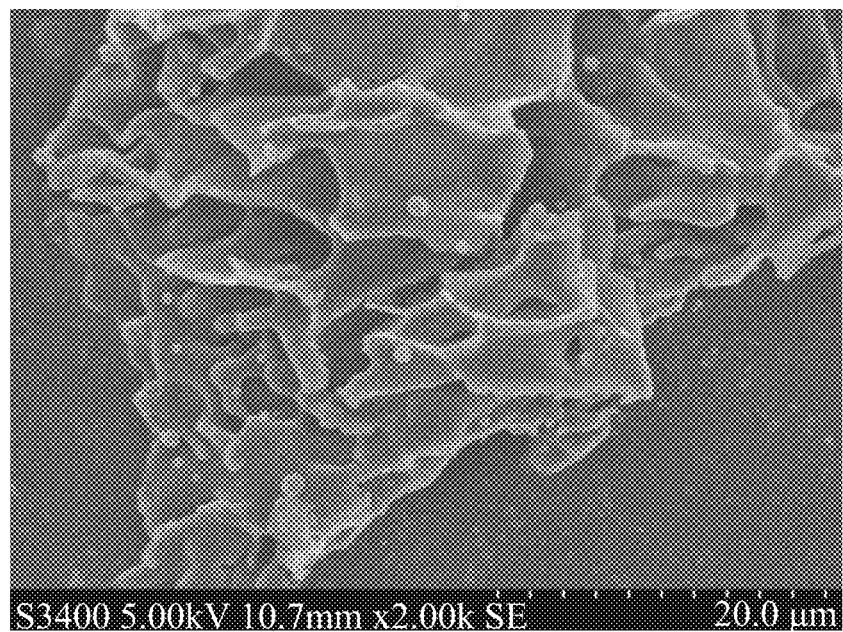
FIG. 16 shows a microstructure of the extruded WPI in the composition with 10% inulin at a magnification of 5000×.
Figure 17:
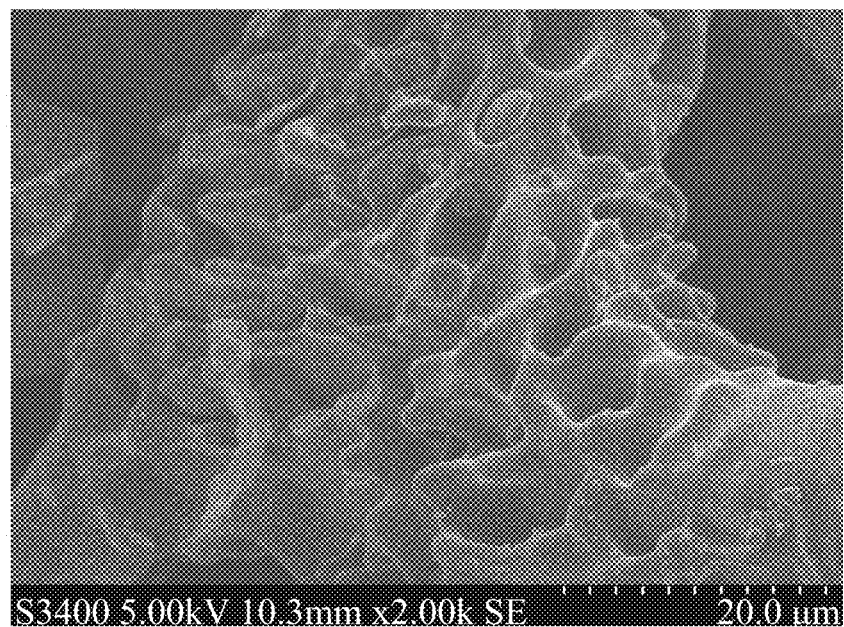
FIG. 17 shows a microstructure of the extruded WPI in the composition with 15% inulin at a magnification of 5000×.

As may be seen from the drawings, the unextruded WPI is mainly spherical in structure (FIG. 10), while after extrusion pretreatment, the protein is mainly block-like in structure (as shown in FIG. 14); besides, with the increase of inulin adding ratio, the extruded proteins are connected with each other to form a honeycomb-like mesh structure containing many pores, while the unextruded proteins form a mesh structure similar to a lamellar layer. When 10% and 15% of inulin were added, there was no significant difference in the microstructure of the proteins. The proteins and inulin are connected by hydrogen bonds at the boundary of the linkage region and undergo hydrophobic interactions, leading to the formation of a gel network with a high degree of cross-linking.

Embodiment 10 Effect of Extruded WPI-Inulin Composition on Titration Acidity and pH During Storage of Fermented Milk Determination of titration acidity of fermented milk containing extruded WPI-inulin composition was carried out with reference to GB 5009.239-2016 National Standard for Food Safety—Determination of Acidity of Food, a State Standard of the People's Republic of China.

The pH of fermented milk containing extruded WPI-inulin composition was determined as follows:

the pH value of fermented milk was determined using a pH meter, where the pH meter was calibrated with phosphate buffer solution before measurement, and the probe was submerged into the sample during measurement and the value was recorded after the value was stabilized; each sample was repeated 3 times.

On the basis of Embodiment 2, the effect of the obtained extruded WPI-inulin composition on the titration acidity and pH during storage of fermented milk under the conditions of changing the adding ratio of inulin to 0%, 5%, 10%, and 15% (g/g, the ratio of inulin/total solid mass of extruded whey protein and inulin) was determined. The specific experimental results are presented in Tables 2 and 3.

TABLE 2

Effect of the adding ratio of inulin in extruded WPI-inulin composition on the titration acidity of fermented milk during storage

| | Titration acidity (° T) | | |
|---|---|---|---|
| Samples | Day 1 | Day 7 | Day 14 |
| Blank | 70.17 ± 0.23$^{gB}$ | 70.75 ± 0.11f$^{AB}$ | 71.17 ± 0.47$^{dA}$ |
| WPI | 78.92 ± 0.83$^{fC}$ | 82.58 ± 1.06$^{eB}$ | 89.42 ± 0.35$^{cA}$ |
| Extruded WPI | 83.59 ± 0.12$^{cdC}$ | 88.67 ± 0.47$^{cB}$ | 94.59 ± 0.59$^{aA}$ |
| WPI + 5% inulin | 80.42 ± 0.59$^{eC}$ | 82.84 ± 0.47$^{eB}$ | 88.67 ± 0.71$^{cA}$ |
| Extruded WPI + 5% inulin | 85.00 ± 0.24$^{bC}$ | 91.34 ± 0.40$^{bB}$ | 94.92 ± 0.12 |
| WPI + 10% inulin | 80.00 ± 1.17$^{efC}$ | 84.92 ± 0.59$^{dB}$ | 89.75 ± 1.53$^{bcA}$ |
| Extruded WPI + 10% inulin | 84.75 ± 0.35$^{bcC}$ | 90.84 ± 0.94$^{bB}$ | 95.00 ± 0.24$^{aA}$ |
| WPI + 15% inulin | 82.92 ± 0.59$^{dC}$ | 85.84 ± 0.23$^{dB}$ | 91.59 ± 1.29$^{bA}$ |
| Extruded WPI + 15% inulin | 86.50 ± 0.24$^{aC}$ | 92.84 ± 0.47$^{aB}$ | 95.67 ± 1.18$^{aA}$ |

Note:
same lowercase (or uppercase) letter in the same column (or row) in the table means the difference is not significant (P > 0.05), different lowercase (or uppercase) letter means the difference is significant (P < 0.05).

TABLE 3

Effect of the adding ratio of inulin in the extruded WPI-inulin composition on the pH of fermented milk during storage

| | PH | | |
|---|---|---|---|
| Samples | Day 1 | Day 7 | Day 14 |
| Blank | 4.64 ± 0.01$^{aA}$ | 4.58 ± 0.01$^{aAB}$ | 4.55 ± 0.04$^{aB}$ |
| WPI | 4.61 ± 0.01$^{abA}$ | 4.51 ± 0.01$^{bB}$ | 4.46 ± 0.02b$^{cC}$ |
| Extruded WPI | 4.59 ± 0.01$^{bcA}$ | 4.50 ± 0.00$^{bcB}$ | 4.44 ± 0.01$^{bcC}$ |
| WPI + 5% inulin | 4.58 ± 0.02$^{cdA}$ | 4.51 ± 0.01$^{bB}$ | 4.47 ± 0.01$^{bB}$ |
| Extruded WPI + 5% inulin | 4.56 ± 0.01$^{cdeA}$ | 4.50 ± 0.01$^{bcB}$ | 4.44 ± 0.00$^{bcC}$ |
| WPI + 10% inulin | 4.57 ± 0.00$^{cdeA}$ | 4.52 ± 0.01$^{bB}$ | 4.46 ± 0.00$^{bcC}$ |
| Extruded WPI + 10% inulin | 4.55 ± 0.01$^{deA}$ | 4.49 ± 0.00$^{bcB}$ | 4.44 ± 0.01$^{bcC}$ |
| WPI + 15% inulin | 4.57 ± 0.01$^{cdeA}$ | 4.51 ± 0.01$^{bB}$ | 4.45 ± 0.01$^{bcC}$ |
| Extruded WPI + 15% inulin | 4.54 ± 0.01$^{eA}$ | 4.48 ± 0.02$^{cB}$ | 4.43 ± 0.02$^{cB}$ |

Note:
same lowercase (or uppercase) letter in the same column (or row) in the table means the difference is not significant (P > 0.05), different lowercase (or uppercase) letter means the difference is significant (P < 0.05).

As may be seen from Tables 2 and 3, the titration acidity of each fermented milk sample gradually increases (P<0.05) with increasing storage period, while the pH value is in a tendency of decreasing (P<0.05) during storage; and the titration acidity of fermented milk with the addition of extruded WPI combined with inulin was significantly increased (P<0.05) compared with the fermented milk with the addition of unextruded WPI combined with inulin. In addition, the fermented milk containing extruded WPI with 15% inulin had the largest titration acidity and the smallest pH value during the same storage period; specifically, the titration acidity of the fermented milk supplemented with 15% inulin in composition with extruded WPI increased by 23.27% on day 1 of storage compared to the blank control (without any addition).

Embodiment 11 Effect of Extruded WPI-Inulin Composition on Water Retention of Fermented Milk During Storage The water retention of extruded whey protein in combination with inulin in fermented milk was determined by the methods as follows:

20 g of the sample to be tested was aspirated into a 50 mL centrifuge tube (the weight of the tube is recorded as M1) and the total weight was recorded as M2; then the tube was centrifuged at 2,795 g for 20 min at 4° C., the supernatant was removed and the total weight of the residue and the centrifuge tube was recorded as M3; the water retention of fermented milk was calculated according to Equation (4).

On the basis of Embodiment 2, the effect of the obtained extruded WPI-inulin composition on water retention during storage of fermented milk under the conditions of varying the adding ratio of inulin to 0%, 5%, 10%, and 15% (g/g, inulin/the ratio of total solid mass of inulin and extruded whey protein). The specific experimental results are presented in Table 4.

TABLE 4

Effect of inulin adding ratio in extruded WPI-inulin composition on water retention of fermented milk during storage

| | Water retention (%) | | |
|---|---|---|---|
| Samples | Day 1 | Day 7 | Day 14 |
| Blank | 50.16 ± 0.20$^{eA}$ | 48.72 ± 0.27$^{dA}$ | 47.33 ± 2.09$^{cA}$ |
| WPI | 60.69 ± 0.24$^{dA}$ | 57.04 ± 1.56$^{cB}$ | 57.35 ± 1.61$^{bAB}$ |
| Extruded WPI | 63.46 ± 1.26$^{cA}$ | 60.99 ± 1.47$^{abcA}$ | 59.12 ± 2.24$^{abA}$ |
| WPI + 5% inulin | 63.87 ± 0.91$^{cA}$ | 58.93 ± 1.13$^{bcB}$ | 59.48 ± 0.26$^{abB}$ |
| Extruded WPI + 5% inulin | 65.63 ± 0.24$^{bA}$ | 64.08 ± 0.54$^{abA}$ | 59.65 ± 1.81$^{abB}$ |
| WPI + 10% inulin | 66.03 ± 0.59$^{bA}$ | 63.77 ± 2.83$^{abA}$ | 61.27 ± 0.55$^{aA}$ |
| Extruded WPI + 10% inulin | 67.01 ± 0.11$^{bA}$ | 65.48 ± 1.33$^{aA}$ | 62.61 ± 0.19$^{aB}$ |
| WPI + 15% inulin | 66.82 ± 0.38$^{bA}$ | 59.81 ± 0.26$^{bcB}$ | 60.40 ± 0.01$^{abB}$ |
| Extruded WPI + 15% inulin | 69.34 ± 0.24$^{aA}$ | 62.64 ± 1.71$^{abAB}$ | 60.98 ± 1.76$^{aB}$ |

Note:
same lowercase (or uppercase) letter in the same column (or row) in the table means the difference is not significant (P > 0.05), and different lowercase (or uppercase) letter means the difference is significant (P < 0.05).

As shown in Table 4, the water retention of fermented milk increases gradually (P<0.05) with the increase of the percentage of inulin addition on day 1 of storage. When 15% inulin was added with extruded WPI-inulin composition, the fermented milk had the highest water retention, which increased by 38.24% and 3.77% compared with the blank group and the fermented milk with 15% inulin and unextruded WPI-inulin composition, respectively. Moreover, the water retention of fermented milk with extruded WPI is higher than that of fermented milk with unextruded WPI compounded with inulin.

The water retention of all fermented milk samples showed a decreasing trend with the increase of storage duration. By day 14, the water retention of the fermented milk samples with the addition of the composition was not significantly changed (P>0.05), but was greater than that of the fermented milk in blank control.

Embodiment 12 Effect of Extruded WPI-Inulin Composition on the Texture of Fermented Milk The texture of fermented milk containing WPI-inulin composition was determined as follows:
the hardness and adhesion of the fermented milk were determined using the TA.XT.plus texture analyzer with the A/BE-d35 probe, and each set of samples was tested three times;
the test parameters were set as follows: pre-test, test and post-test speeds of 2 mm/s, 1 mm/s, and 2 mm/s respectively, test distance of 10 mm, trigger force of 5 g, and two compression intervals of 5 s.

On the basis of Embodiment 2, the effect of the obtained extruded WPI-inulin composition on the texture of fermented milk under the conditions of changing the adding ratio of inulin to 0%, 5%, 10%, and 15% (g/g, the ratio of total solid mass of inulin/inulin and extruded whey protein) was investigated. The specific experimental results are shown in Table 5.

TABLE 5

Effect of the adding ratio of inulin in the extruded WPI-inulin composition on the texture of fermented milk

| Samples | Hardness (g) | Adhesion (g · s) |
|---|---|---|
| Blank | $16.44 \pm 0.15^h$ | $-78.07 \pm 0.46^g$ |
| WPI | $34.74 \pm 0.07^g$ | $-216.46 \pm 0.70^f$ |
| Extruded WPI | $38.87 \pm 0.16^f$ | $-236.83 \pm 5.82^e$ |
| WPI + 5% inulin | $48.93 \pm 0.53^e$ | $-248.13 \pm 0.56^d$ |
| Extruded WPI + 5% inulin | $48.92 \pm 0.63^e$ | $-266.40 \pm 1.47^c$ |
| WPI + 10% inulin | $52.66 \pm 0.64^d$ | $-254.40 \pm 5.60^d$ |
| Extruded WPI + 10% inulin | $55.66 \pm 0.62^c$ | $-282.13 \pm 6.22^b$ |
| WPI + 15% inulin | $57.92 \pm 0.97^b$ | $-273.33 \pm 4.79^{bc}$ |
| Extruded WPI + 15% inulin | $59.37 \pm 0.43^a$ | $-310.96 \pm 7.08^a$ |

Note:
same lowercase letter in the same column in the table means the difference is not significant (P > 0.05), and different lowercase letter means the difference is significant (P < 0.05).

The texture of fermented milk is also one of the important indicators of fermented milk quality, where adhesion indicates the work done to overcome the attraction between the surface of the fermented milk and the surface of the plasmatic probe, and the negative force value indicates the adhesion of the fermented milk to the plasmatic probe, i.e., the larger the absolute value of the force, the more viscous the fermented milk is, and the more fermented milk sticks to the plasmatic probe when it is pulled up, indicating that the fermented milk is more viscous.

As may be seen from Table 5, the absolute values of hardness and adhesion of all fermented milk samples showed a gradual increase (P<0.05) with the increase in the percentage of inulin addition. The fermented milk with the addition of 15% inulin in composition with extruded WPI had the greatest hardness and adhesion of 59.37 g and −310.96 g·s, with the absolute values of hardness and adhesion, compared with the blank control, extruded WPI only, fermented milk with the addition of 15% inulin in composition with unextruded WPI, increased by 261.13% and 298.31%, 52.74% and 31.30%, 2.50% and 13.77%, respectively.

Embodiment 13 Effect of Extruded WPI-Inulin Composition on Sensory Evaluation of Fermented Milk Determination of sensory evaluation of fermented milk containing extruded WPI-inulin composition was carried out by the following methods:

with reference to the requirements for sensory characteristics of fermented milk in GB 19302-2010 National Food Safety Standard—Fermented Milk, five sensory evaluation factors were set, namely color and luster (10 points), scent (25 points), taste (15 points), texture (20 points), and tissue state (30 points); five people were randomly selected for sensory evaluation training, where systematic theoretical training in addition to intensive and verbal description training were required for the five evaluators so as to improve their ability to perceive and describe sensory stimuli; after tasting, mouths were immediately rinsed with water and tasted again after an interval of 15 min; each evaluation member scored individually without mutual communication and discussion. The specific sensory scores are shown in Table 6.

TABLE 6

Sensory evaluation criteria for fermented milk

| Factors | Evaluation Criteria | Rating |
|---|---|---|
| Color and luster (10 points) | Uniform color, light creamy yellow and creamy white | 10-7 |
| | Rather uniform color with light yellow | 6-4 |
| | Uneven color with light gray or off-white | 3-0 |
| Scent (25 points) | Strong fermented milk flavor, obvious milk flavor, no other off flavors | 25-17 |
| | Flavor of fermented milk, lack of milk flavor | 16-9 |
| | Fermented milk flavor is not prominent, almost no milk flavor | 8-0 |
| Taste (15 points) | Sweet and sour, delicate | 15-11 |
| | Sour or sweet, slightly unpleasant | 10-6 |
| | Too sour or too sweet, poor taste | 5-0 |
| Texture (20 points) | Delicate and soft, smooth and grain-free | 20-15 |
| | Slightly light in taste, not pure, slightly granular | 14-10 |
| | Poor mouthfeel, strong graininess | 9-0 |
| Tissue status (30 points) | No clot, uniform texture, smooth surface, slight whey precipitation | 30-21 |
| | Clot, smooth surface, rather severe whey precipitation | 21-11 |
| | Rough tissue condition, severe whey precipitation | 10-0 |

On the basis of Embodiment 2, the effect of the obtained extruded WPI-inulin composition on the sensory evaluation of fermented milk under the conditions of changing the adding ratio of inulin to 0%, 5%, 10% and 15% (g/g, the ratio of total solid mass of inulin/inulin and extruded whey protein). The specific test results are shown in Table 7.

TABLE 7

Effect of the adding ratio of inulin in the extruded WPI-inulin composition on the sensory evaluation of fermented milk

| Samples | Color and luster/Points | Scent/Points | Taste/Points | Texture/Points | Texture status/Points | Total points/Points |
|---|---|---|---|---|---|---|
| Blank | $9.24 \pm 0.06^a$ | $17.83 \pm 0.07^c$ | $11.89 \pm 0.01^f$ | $16.18 \pm 0.03^b$ | $16.95 \pm 0.08^f$ | $72.09 \pm 0.25^f$ |
| WPI | $9.24 \pm 0.04^a$ | $18.23 \pm 0.11^b$ | $12.37 \pm 0.02^d$ | $16.44 \pm 0.02^a$ | $17.74 \pm 0.23^e$ | $74.00 \pm 0.24^e$ |
| Extruded WPI | $9.24 \pm 0.13^a$ | $18.24 \pm 0.38^b$ | $12.38 \pm 0.21^{cd}$ | $16.43 \pm 0.04^a$ | $19.28 \pm 0.40^d$ | $75.56 \pm 0.38^d$ |
| WPI + 5% | $9.23 \pm 0.04^a$ | $18.25 \pm 0.06^b$ | $12.43 \pm 0.12^{abc}$ | $16.50 \pm 0.01^a$ | $18.94 \pm 0.09^d$ | $75.33 \pm 0.13^d$ |

TABLE 7-continued

Effect of the adding ratio of inulin in the extruded WPI-inulin composition on the sensory evaluation of fermented milk

| Samples | Color and luster/Points | Scent/Points | Taste/Points | Texture/Points | Texture status/Points | Total points/Points |
|---|---|---|---|---|---|---|
| inulin Extruded WPI + 5% inulin | 9.25 ± 0.04$^a$ | 18.26 ± 0.05$^{ab}$ | 12.44 ± 0.27$^{ab}$ | 16.56 ± 0.03$^a$ | 23.25 ± 0.01$^a$ | 79.75 ± 0.08$^a$ |
| WPI + 10% inulin | 9.29 ± 0.02$^a$ | 18.30 ± 0.01$^{ab}$ | 12.47 ± 0.03a | 16.54 ± 0.28$^a$ | 21.11 ± 0.16$^c$ | 77.70 ± 0.23$^c$ |
| Extruded WPI + 10% inulin | 9.31 ± 0.01$^a$ | 18.29 ± 0.27$^{ab}$ | 12.39 ± 0.17$^{bcd}$ | 16.48 ± 0.14$^a$ | 23.26 ± 0.11$^a$ | 79.71 ± 0.04$^a$ |
| WPI + 15% inulin | 9.30 ± 0.01$^a$ | 18.30 ± 0.02$^{ab}$ | 12.35 ± 0.34$^d$ | 15.57 ± 0.62$^c$ | 22.18 ± 0.08$^b$ | 77.69 ± 0.06$^c$ |
| Extruded WPI + 15% inulin | 9.30 ± 0.03$^a$ | 18.32 ± 0.15$^a$ | 12.27 ± 0.05$^e$ | 15.20 ± 0.28$^d$ | 23.27 ± 0.94$^a$ | 78.35 ± 0.28$^b$ |

Note:
same lowercase letter in the same column in the table means the difference is not significant (P > 0.05), and different lowercase letter means the difference is significant (P < 0.05).

As shown in Table 7, the addition of extruded WPI in composition with inulin significantly affects the scent, taste, texture, tissue status and total score of fermented milk (P<0.05), while there is no significant effect on color and luster (P>0.05). In terms of scent, the addition of inulin and protein imparts a strong fermented milk scent and milk flavor to the fermented milk, resulting in a higher score than the score of fermented milk of the blank group. In terms of taste and texture, when 5% inulin-extruded WPI-inulin composition was added, the fermented milk was delicate, moderately sweet and sour, with a smooth texture and better sensory quality, resulting in the highest sensory score; while when the percentage of added inulin was gradually increased, the viscosity and hardness of the fermented milk became larger and the fermented milk became grainy, and the fermented milk was too thick and slightly less palatable, resulting in a lower score of taste and texture of the fermented milk. In terms of tissue state, the fermented milk of the blank control group had whey precipitation and a small amount of clots, while the fermented milk with the addition of extruded WPI and inulin composition had a uniform texture, smooth surface and slight whey precipitation; moreover, the score of tissue state of fermented milk with extruded WPI and inulin composition was significantly higher than that of fermented milk without extruded WPI and inulin composition, indicating that the extruded WPI could form a gel network system with three-dimensional structure and improve the tissue state of fermented milk. Collectively, the fermented milk with 5% inulin compounded with extruded WPI had the highest total score.

Embodiment 14 Effect of Extruded WPI-Inulin Composition on the Count of Viable Lactic Acid Bacteria During Storage of Fermented Milk Determination of the viable lactic acid bacteria in fermented milk containing extruded WPI-inulin composition was carried out by the following methods:

referring to GB 4789.35-2016 National Standards for Food Safety—Food Microbiology Test for Lactic Acid Bacteria, the count of viable bacteria of *Lactobacillus bulgaricus* and *Streptococcus thermophilus* were determined;

on the basis of Embodiment 2, the effect of the obtained extruded WPI-inulin composition on the viable count of lactic acid bacteria during storage of fermented milk under the conditions of changing the adding ratio of inulin to 0%, 5%, 10% and 15% (g/g, the ratio of total solid mass of inulin/inulin and extruded whey protein) was investigated. The specific experimental results are presented in Table 8.

TABLE 8

Effect of inulin adding ratio on the viable count of lactic acid bacteria during storage of fermented milk

| | Count of *Streptococcus thermophilus* (×10$^7$ CFU/mL) | | | Count of *Lactobacillus bulgaricus* (×10$^7$ CFU/mL) | | |
|---|---|---|---|---|---|---|
| Samples | Day 1 | Day 7 | Day 14 | Day 1 | Day 7 | Day 14 |
| Blank | 4.9 ± 0.2$^{fA}$ | 4.7 ± 0.1$^{fA}$ | 4.1 ± 0.1$^{bdB}$ | 4.4 ± 0.1$^{fA}$ | 4.0 ± 0.1$^{eA}$ | 3.4 ± 0.1$^{fB}$ |
| WPI | 6.6 ± 0.3$^{eA}$ | 6.6 ± 0.1$^{eA}$ | 5.3 ± 0.4$^{cB}$ | 6.0 ± 0.3$^{eA}$ | 5.7 ± 0.3$^{dA}$ | 4.4 ± 0.1$^{eB}$ |
| Extruded WPI | 7.0 ± 0.3$^{deA}$ | 7.1 ± 0.1$^{cdA}$ | 5.9 ± 0.2$^{bB}$ | 6.6 ± 0.1$^{bcdA}$ | 6.1 ± 0.1$^{cdB}$ | 5.2 ± 0.1$^{cdC}$ |
| WPI + 5% inulin | 7.2 ± 0.2$^{cdeA}$ | 7.1 ± 0.2$^{cdA}$ | 5.7 ± 011$^{bcB}$ | 6.4 ± 0.2$^{deA}$ | 5.9 ± 0.2$^{cdA}$ | 4.8 ± 0.3$^{dB}$ |
| Extruded WPI + 5% inulin | 7.5 ± 0.3$^{bcdA}$ | 7.5 ± 0.1$^{bcA}$ | 6.3 ± 0.3$^{abB}$ | 6.9 ± 0.1$^{bcA}$ | 6.8 ± 0.1$^{bA}$ | 5.9 ± 0.2$^{abB}$ |
| WPI + 10% inulin | 7.3 ± 0.2$^{cdA}$ | 7.0 ± 0.2$^{deA}$ | 6.0 ± 0.3$^{abB}$ | 6.5 ± 0.4$^{cdeA}$ | 6.2 ± 0.3$^{cA}$ | 4.9 ± 0.2$^{dB}$ |
| Extruded WPI + 10% | 7.9 ± 0.1$^{abA}$ | 7.7 ± 0.4$^{bA}$ | 6.2 ± 0.2$^{abB}$ | 7.0 ± 0.1$^{bA}$ | 6.9 ± 0.2$^{bA}$ | 6.0 ± 0.2$^{aB}$ |

TABLE 8-continued

Effect of inulin adding ratio on the viable count of lactic acid bacteria during storage of fermented milk

| | Count of *Streptococcus thermophilus* ($\times 10^7$ CFU/mL) | | | Count of *Lactobacillus bulgaricus* ($\times 10^7$ CFU/mL) | | |
|---|---|---|---|---|---|---|
| Samples | Day 1 | Day 7 | Day 14 | Day 1 | Day 7 | Day 14 |
| WPI + 15% | $7.6 \pm 0.3^{bcA}$ | $7.6 \pm 0.1^{bA}$ | $6.1 \pm 0.2^{abB}$ | $7.0 \pm 0.1^{bA}$ | $6.8 \pm 0.1^{bA}$ | $5.5 \pm 0.1^{bcB}$ |
| Extruded WPI + 15% | $8.4 \pm 0.1^{aA}$ | $8.3 \pm 0.2^{aA}$ | $6.6 \pm 0.3^{aB}$ | $7.5 \pm 0.2^{aA}$ | $7.4 \pm 03^{aA}$ | $6.1 \pm 0.3^{aB}$ |

Note:
same lowercase (or uppercase) letter in the same column (or row) in the table means the difference is not significant (P > 0.05), and different same lowercase (or uppercase) letter means the difference is significant (P < 0.05).

As shown in Table 8, the total viable counts of *Streptococcus thermophilus* and *Lactobacillus bulgaricus* in all fermented milk samples were always higher than the viable counts of fermented milk (>1×10$^6$ CFU/mL) specified in the Chinese national standard (GB 19302-2010) during the storage period, and they all gradually decreased with the extension of storage duration, but there was no significant difference between the viable counts on day 1 and day 7 (P>0.05). The viable counts of *Streptococcus thermophilus* and *Lactobacillus bulgaricus* in fermented milk with unextruded WPI and extruded WPI were higher than those in the blank control (P<0.05), and the addition of extruded WPI was more favorable to the proliferation of *Streptococcus thermophilus* and *Lactobacillus bulgaricus*. The highest number of viable *Streptococcus thermophilus* and *Lactobacillus bulgaricus* survived in the fermented milk when 15% inulin was added in composition with extruded WPI. Furthermore, as shown in Table 8, the extruded WPI-inulin composition was able to slow down the rate of reduction in the viable count of *Lactobacillus bulgaricus* in the fermented milk within 14 days. Compared to the case without extruded whey protein, the extruded WPI-inulin composition is able to significantly slow down the rate of reduction of *Lactobacillus bulgaricus* viable counts in fermented milk after extrusion pretreatment. Embodiment 15 Effect of extruded WPI-inulin composition on static rheology of fermented milk during storage Determination of static rheology of fermented milk containing extruded WPI-inulin composition was carried out as follows:

the fermented milk containing protein composition with different inulin adding ratios was measured according to the measurement method of Embodiment 8;

the effect of the obtained extruded WPI-inulin composition on the static rheology of fermented milk during storage under the conditions of varying the inulin adding ratio of 0%, 5%, 10% and 15% (g/g, the ratio of total solid mass of inulin/inulin and extruded whey protein) was investigated on the basis of Embodiment 2. The specific experimental results are shown in FIG. 18-FIG. 23 and Table 9-Table 11.

The rheology of fermented milk refers to the properties of the flow and deformation of fermented milk under the action of external forces in response to changes in shear rate and shear stress, mainly the link between shear rate and apparent viscosity, shear rate and shear stress. Therefore it may be used to determine the fluid type of fermented milk and to evaluate the viscosity of fermented milk, etc.

Figure 18:
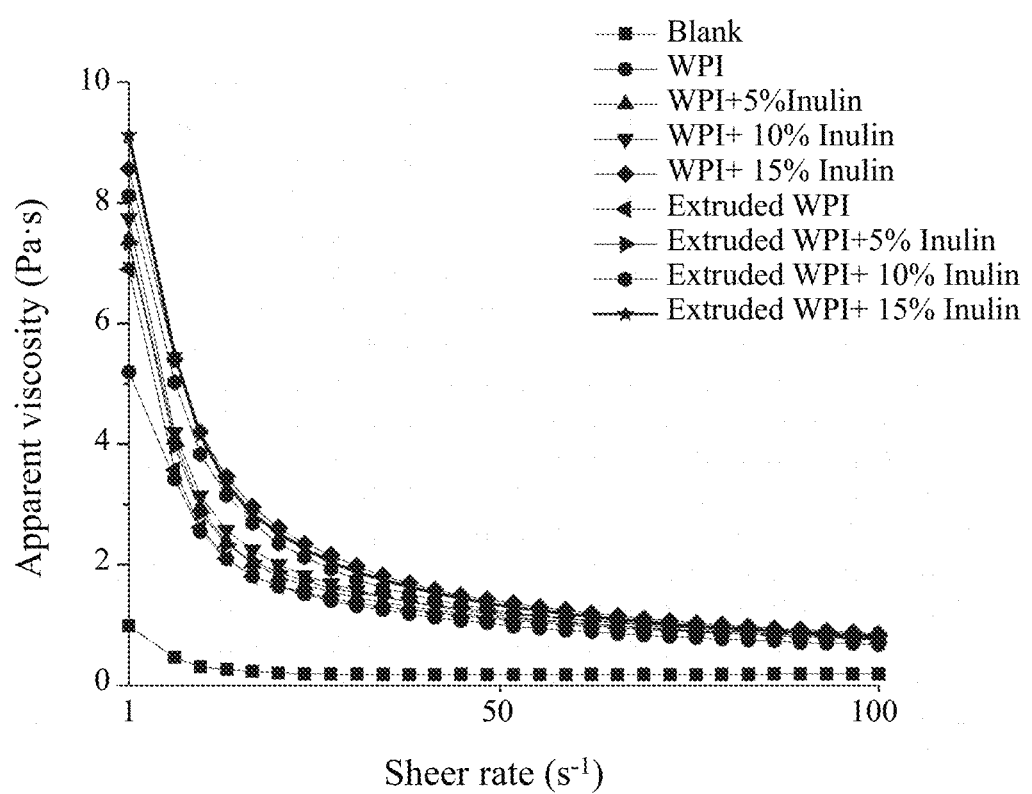
FIG. 18 shows an analytical diagram illustrating the change in apparent viscosity of fermented milk containing different proportions of inulin in composition with extruded/unextruded WPI on day 1 of storage.
Figure 19:
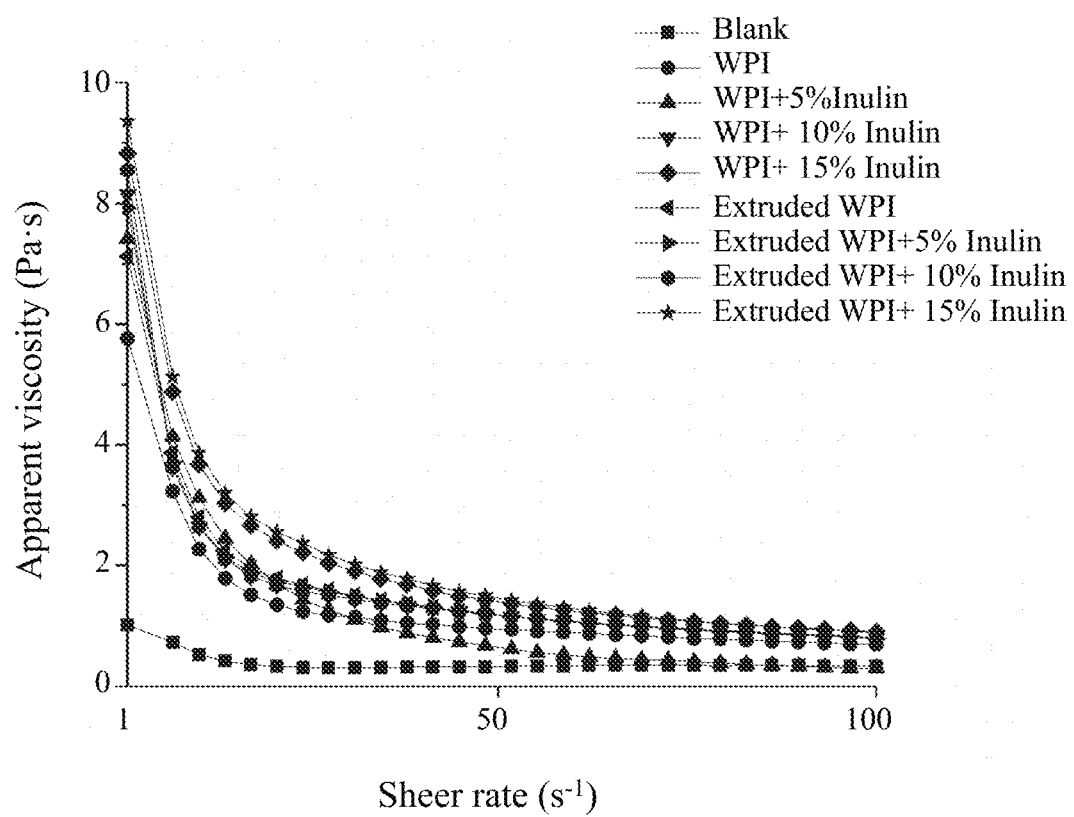
FIG. 19 shows an analytical diagram illustrating the change in apparent viscosity of fermented milk containing different proportions of inulin in composition with extruded/unextruded WPI on day 7 of storage.
Figure 20:
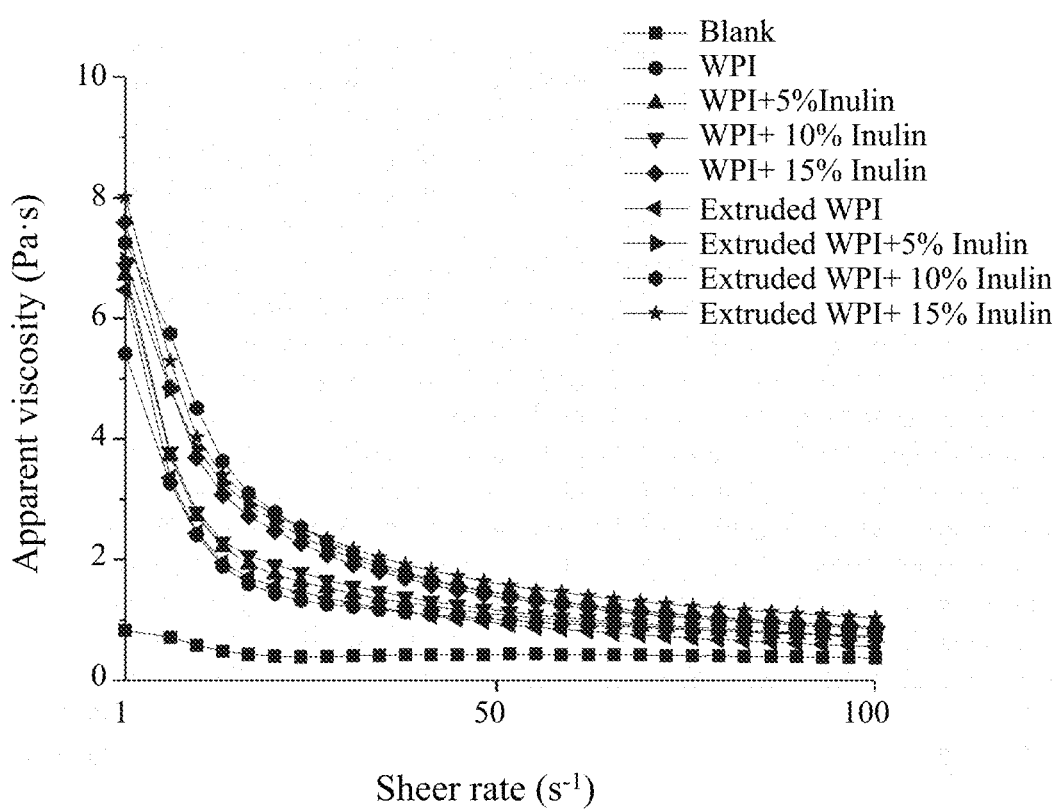
FIG. 20 shows an analytical diagram illustrating the change in apparent viscosity of fermented milk containing different proportions of inulin in composition with extruded/unextruded WPI on day 14 of storage.
Figure 21:
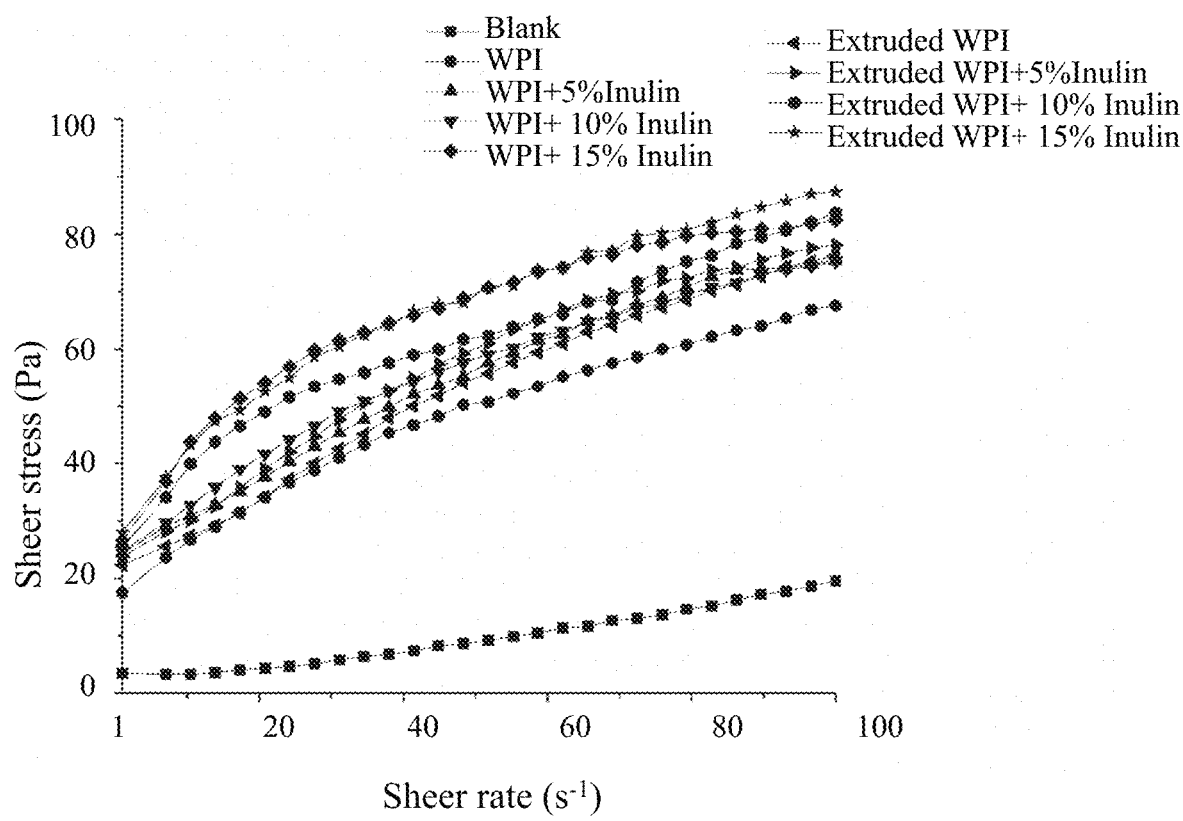
FIG. 21 shows an analytical diagram illustrating the change in shear stress of fermented milk on day 1 of storage which was prepared using the WPI-inulin composition containing different proportions of inulin in with extruded/unextruded WPI.
Figure 22:
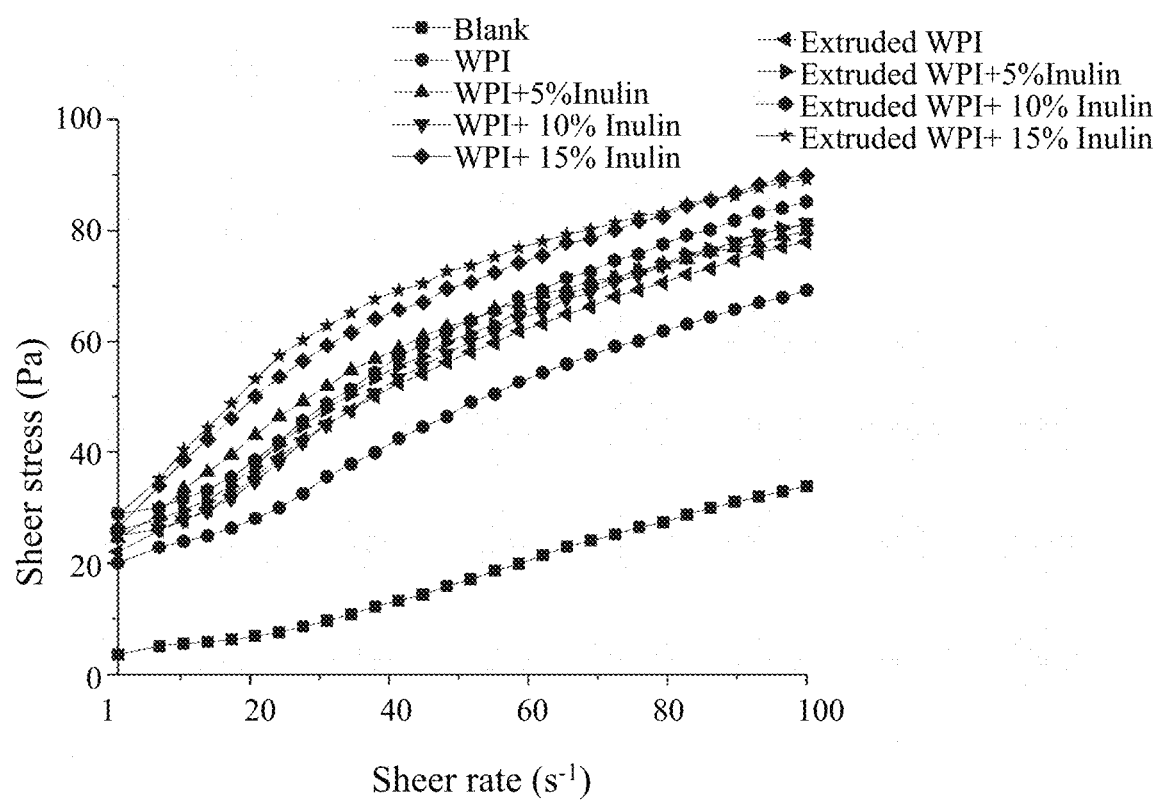
FIG. 22 shows an analytical diagram illustrating the change in shear stress of fermented milk on day 7 of storage which was prepared using the WPI-inulin composition containing different proportions of inulin in with extruded/unextruded WPI.
Figure 23:
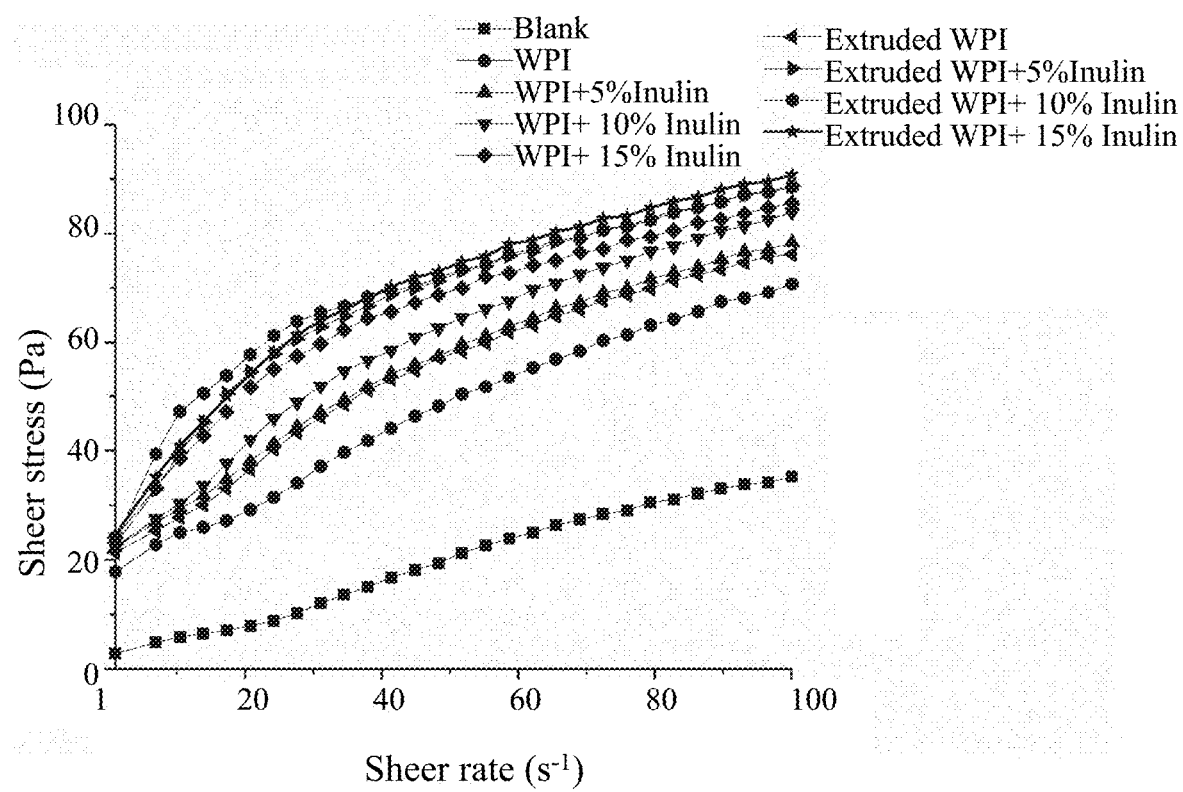
FIG. 23 shows an analytical diagram illustrating the change in shear stress of fermented milk on day 14 of storage which was prepared using the WPI-inulin composition containing different proportions of inulin in with extruded/unextruded WPI.

As shown in FIG. 18-FIG. 20, all samples exhibited a result of shear dilution where the apparent viscosity gradually decreased with increasing shear rate. The samples exhibiting such negative correlation were considered as pseudoplastic fluid, which was also known by the concave direction of the curves in FIG. 21-FIG. 23. The apparent viscosity tended to increase with the increase of inulin addition. And the fermented milk with 15% inulin added in composition with extruded WPI had higher apparent viscosity. For different storage duration, the samples showed the same trend. However, the apparent viscosity of all samples decreased as the storage duration increased.

The variation of the viscosity index K and the flow behavior index n, obtained by fitting the power law model (FIG. 21-FIG. 23), are shown in Table 9-Table 11. Firstly, the n values of all samples are less than 1, which indicates that the samples belong to pseudoplastic fluid. The value of viscosity index K increased gradually (P<0.05) with the increase of inulin adding ratio, indicating that the viscosity of fermented milk increased. There was no significant difference (P>0.05) in the value of viscosity coefficient K between fermented milk with extruded WPI added and fermented milk with unextruded WPI added at the first day of storage; but with the extension of storage duration, the value of viscosity coefficient K of fermented milk with extruded WPI added decreased to a low extent while retaining a higher viscosity. The fermented milk with 15% inulin added in composition with extruded WPI had the largest viscosity coefficient K values at all storage periods, indicating that the fermented milk was the most viscous and the least liquid.

TABLE 9

Effect of inulin adding ratio on the viscosity index and flow behavior index of fermented milk on day 1 of storage

| Samples | Viscosity index K (Pa · s$^n$) | Flow behavior index n | R$^2$ |
|---|---|---|---|
| Blank | $0.92 \pm 0.29^f$ | $0.67 \pm 0.01^a$ | 0.98 |
| WPI | $24.11 \pm 0.84^e$ | $0.54 \pm 0.01^b$ | 0.98 |
| Extruded WPI | $24.36 \pm 1.00^e$ | $0.53 \pm 0.02^{bc}$ | 0.97 |
| WPI + 5% inulin | $27.69 \pm 0.90^d$ | $0.52 \pm 0.03^{bcd}$ | 0.98 |
| Extruded WPI + 5% inulin | $28.56 \pm 1.30^d$ | $0.51 \pm 0.02^{cd}$ | 0.96 |
| WPI + 10% inulin | $31.30 \pm 1.09^c$ | $0.49 \pm 0.02^{de}$ | 0.96 |
| Extruded WPI + 10% inulin | $36.22 \pm 1.15^b$ | $0.47 \pm 0.02^{ef}$ | 0.96 |
| WPI + 15% inulin | $40.71 \pm 1.51^a$ | $0.47 \pm 0.02^{ef}$ | 0.94 |
| Extruded WPI + 15% inulin | $42.60 \pm 1.90^a$ | $0.46 \pm 0.03^f$ | 0.89 |

Note:
same lowercase letter in the same column in the table means the difference is not significant (P > 0.05), and different lowercase letter means the difference is significant (P < 0.05).

TABLE 10

Effect of inulin adding ratios on the viscosity index and flow behavior index of fermented milk on day 7 of storage

| Samples | Viscosity index K (Pa·s$^n$) | Flow behavior index n | $R^2$ |
|---|---|---|---|
| Blank | 0.94 ± 0.39$^h$ | 0.63 ± 0.01$^a$ | 0.99 |
| WPI | 29.16 ± 0.63$^g$ | 0.53 ± 0.01$^b$ | 0.99 |
| Extruded WPI | 33.80 ± 1.05$^{ef}$ | 0.49 ± 0.02$^c$ | 0.98 |
| WPI + 5% inulin | 32.36 ± 1.56$^f$ | 0.49 ± 0.03$^{cd}$ | 0.94 |
| Extruded WPI + 5% inulin | 36.11 ± 1.16$^d$ | 0.48 ± 0.02$^{cd}$ | 0.97 |
| WPI + 10% inulin | 34.57 ± 1.04$^{de}$ | 0.48 ± 0.02$^{cd}$ | 0.98 |
| Extruded WPI + 10% inulin | 39.98 ± 1.55$^c$ | 0.46 ± 0.03$^{cd}$ | 0.98 |
| WPI + 15% inulin | 42.58 ± 1.04$^b$ | 0.45 ± 0.02$^d$ | 0.91 |
| Extruded WPI + 15% inulin | 45.84 ± 1.92$^a$ | 0.41 ± 0.03$^e$ | 0.95 |

Note:
same lowercase letter in the same column in the table means the difference is not significant ($P > 0.05$), and different lowercase letter means the difference is significant ($P < 0.05$).

TABLE 11

Effect of inulin adding ratio on the viscosity index and flow behavior index of fermented milk on day 14 of storage

| Samples | Viscosity index K (Pa·s$^n$) | Flow behavior index n | $R^2$ |
|---|---|---|---|
| Blank | 0.89 ± 0.39$^f$ | 0.75 ± 0.01$^a$ | 0.99 |
| WPI | 19.84 ± 0.68$^e$ | 0.64 ± 0.01$^b$ | 0.99 |
| Extruded WPI | 26.23 ± 1.25$^d$ | 0.56 ± 0.02$^c$ | 0.96 |
| WPI + 5% inulin | 27.27 ± 1.15$^{cd}$ | 0.56 ± 0.02$^c$ | 0.97 |
| Extruded WPI + 5% inulin | 30.04 ± 2.18$^c$ | 0.53 ± 0.04$^{cd}$ | 0.89 |
| WPI + 10% inulin | 29.66 ± 1.47$^c$ | 0.54 ± 0.02$^c$ | 0.96 |
| Extruded WPI + 10% inulin | 34.41 ± 2.13$^b$ | 0.50 ± 0.04$^{de}$ | 0.88 |
| WPI + 15% inulin | 38.54 ± 1.93$^a$ | 0.49 ± 0.03$^{de}$ | 0.91 |
| Extruded WPI + 15% inulin | 40.79 ± 2.12$^a$ | 0.47 ± 0.04$^e$ | 0.90 |

Note:
same lowercase letter in the same column in the table means the difference is not significant ($P > 0.05$), and different lowercase letter means the difference is significant ($P < 0.05$).

Embodiment 16

The method of principal component analysis was used to determine the appropriate inulin adding ratio that could maximize the overall quality of the fermented milk containing extruded WPI-inulin composition.

Principal component analysis method wad as follows:

Principal component analysis was performed using Origin 2017 (OriginLab Corporation, Northampton, Mass., USA) for sensory evaluation, acidity, pH, water retention, texture, viable bacteria count, rheology (viscosity index) and other characteristics of the fermented milk on day 1 of storage.

Principal component analysis is a multivariate dimensionality reduction analysis method in which multiple parameters are linearly transformed to select fewer (usually two principal components) significant parameters. It was found that the variance contribution of the first two principal components were 77.88% and 13.81%, and the cumulative variance contribution reached 91.69%, indicating that the two principal components PC 1 (first principal component) and PC 2 (second principal component) could reflect all the information of the original variables. The specific test results were shown in FIG. 24 and FIG. 25.

Figure 24:
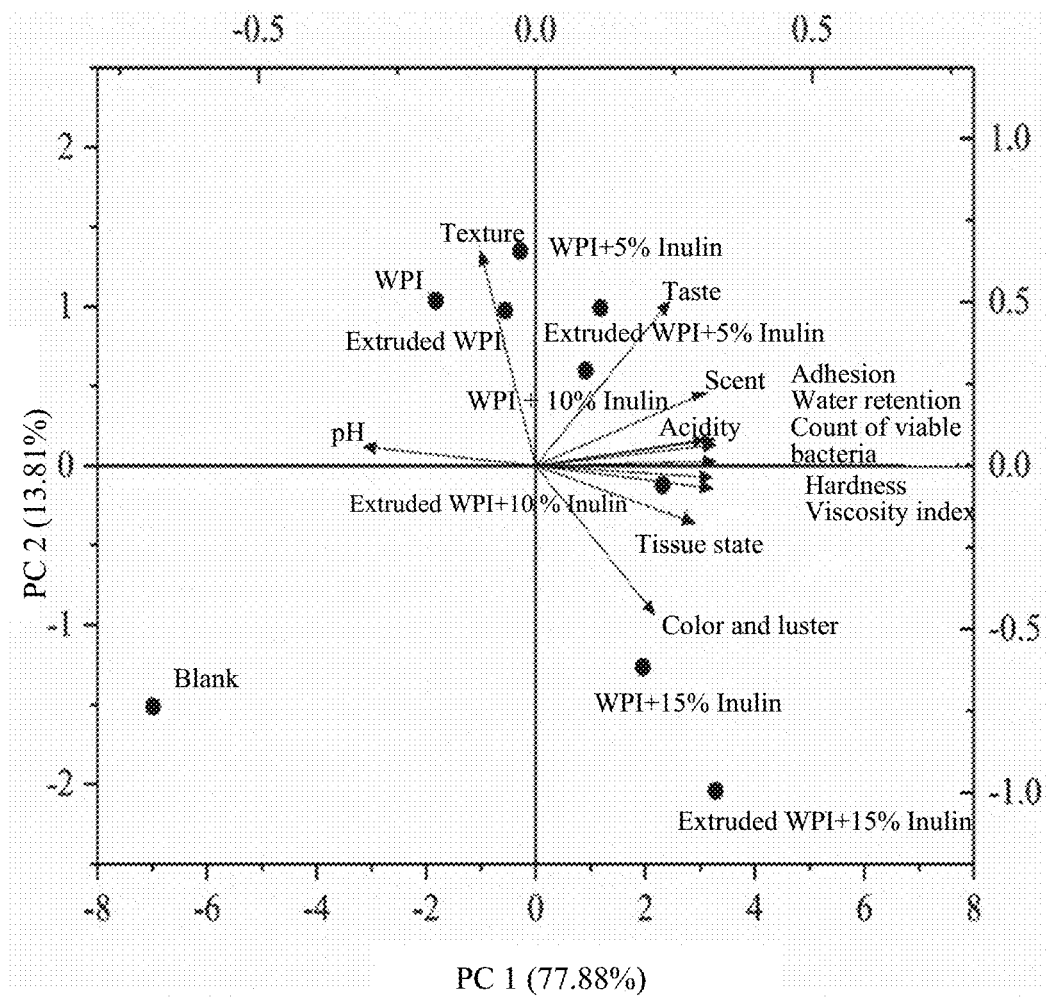
FIG. 24 shows a principal component loading plot and score plot illustrating fermented milk PC 1 and PC 2 prepared using compositions containing different proportions of inulin with extruded/unextruded WPI.

As may be seen in FIG. 24, the indicators associated with PC 1 were color and luster, scent, tissue status, acidity, water retention, number of viable bacteria, hardness and viscosity index; the indicators associated with PC 2 were taste, texture and pH; the indicators of samples (fermented milk of 10% inulin compounded with WPI and fermented milk with 5% inulin compounded with extruded WPI) in the first quadrant were taste, scent, acidity, adhesivity, water retention and viable bacteria; the samples in the second quadrant (the fermented milk with only unextruded WPI, the fermented milk with 5% inulin and WPI-inulin composition and the fermented milk with only extruded WPI) were characterized by taste and pH; while the samples in blank control were classified in the third quadrant without any property; the samples in the fourth quadrant (the fermented milk with 15% inulin and WPI-inulin composition, the fermented milk with 10% inulin and extruded WPI-inulin composition and the fermented milk with 15% inulin and extruded WPI-inulin composition) were characterized by hardness, viscosity index, tissue state, and color and luster. Thus, it may be seen that different samples are associated with different characteristic indices.

Figure 25:
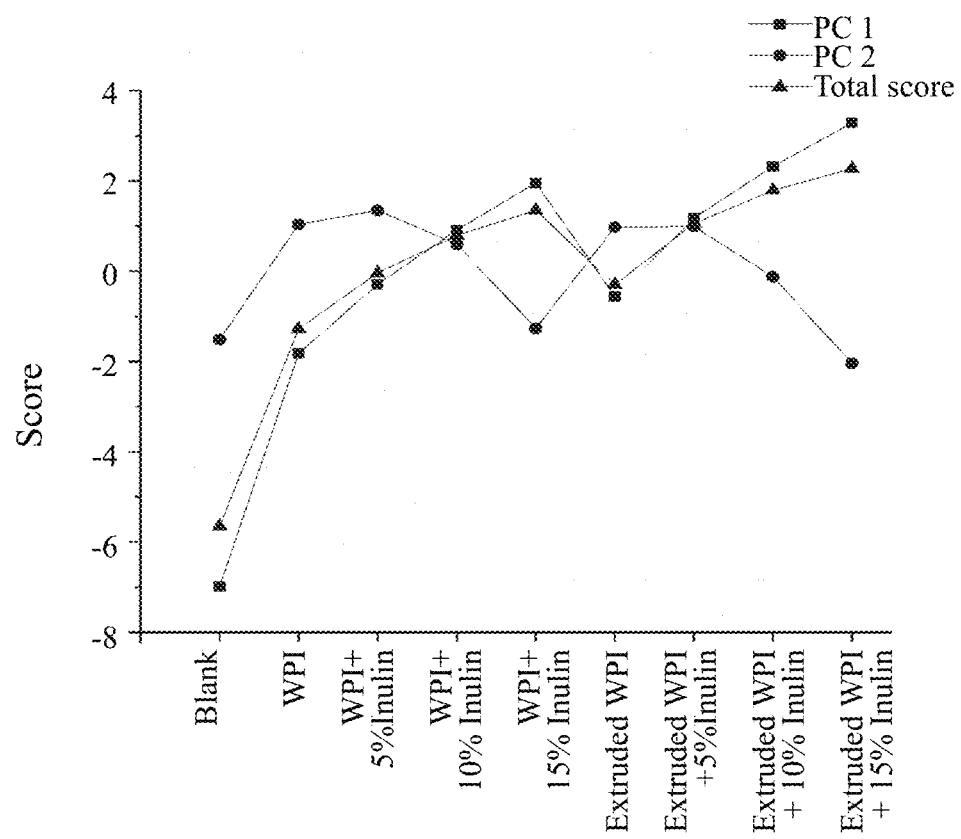
FIG. 25 shows a tendency of the scores and overall scores for PC 1 and PC 2 of the fermented milk.

As may be seen from FIG. 25, the fermented milk added with 15% inulin in composition with extruded WPI had the highest score in PC 1, indicating that the fermented milk added with 15% inulin in composition with extruded WPI may effectively improve the indexes related to PC 1, especially the indexes of hardness, viscosity index, tissue state and color and luster; the fermented milk added with 5% inulin in composition with WPI had the highest score in PC 2, indicating that fermented milk added with 5% inulin in composition with WPI may effectively improve the indexes related to PC 2, especially the indexes such as taste and pH. The trend of the total score showed that the fermented milk with 15% inulin in combination with extruded WPI-inulin composition has the highest score. This indicates that, as a whole, the addition of 15% inulin with extruded WPI-inulin composition may improve the overall quality of fermented milk to the greatest extent.

The embodiments described above are only a description of the preferred manner of this disclosure, and are not intended to limit the scope of this disclosure. Without departing from the spirit of the design of this disclosure, all kinds of variations and improvements made by a person of ordinary skill in the art to the technical solutions of this disclosure shall fall within the scope of protection determined by the claims of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A fermented milk, comprising an extruded whey protein isolate (WPI)-inulin composition, wherein:
the fermented milk is prepared by adding the extruded WPI-inulin composition into raw milk, wherein a mass-volume ratio (g/mL) of the extruded WPI-inulin composition to the raw milk is in a range of (1.0-3.5): 100; and the inulin in the extruded WPI-inulin composition accounts for 5% to 15% by weight of a total weight of the extruded WPI and the inulin;
the fermented milk is prepared as follows:
step 1, preparing the extruded WPI-inulin composition by mixing inulin with a whey protein extruded at a temperature within a range of 45-55° C.;
step 2, adding sucrose and the extruded WPI-inulin composition into the raw milk, and uniformly mixing and stirring the sucrose, the extruded WPI-inulin composition, and the raw milk to obtain a material A;
step 3, preheating, homogenizing, sterilizing, and cooling the material A to obtain a fermentation substrate;
step 4, adding a fermentation agent into the fermentation substrate, filling the fermentation substrate in a container, and then performing heat-preserved fermentation, and ending the fermentation to obtain a material B;
step 5, cooling the material B, and then refrigerating the material B to obtain fermented milk;
wherein the preparing the extruded WPI-inulin composition in the step 1 specifically includes:
S1, carrying out an extrusion pretreatment on whey protein at an extrusion temperature within the range of 45-55° C. to obtain extruded whey protein, then freeze-drying the extruded whey protein, and grinding the freeze-dried extruded whey protein into powder; and
S2, dissolving powdered whey protein and inulin in deionized water at room temperature to obtain a composition solution after stirring, then freeze-drying the composition solution to obtain a freeze-dried composition, and grinding the freeze-dried composition into powder to obtain the extruded WPI-inulin composition.

2. A method for preparing a fermented milk containing an extruded whey protein isolate (WPI)-inulin composition, comprising the following steps:
step 1, preparing the extruded WPI-inulin composition by mixing inulin with a whey protein extruded at a temperature within a range of 45-55° C.;
step 2, adding sucrose and the extruded WPI-inulin composition into the raw milk, and uniformly mixing and stirring the sucrose, the extruded WPI-inulin composition, and the raw milk to obtain a material A;
step 3, preheating, homogenizing, sterilizing, and cooling the material A to obtain a fermentation substrate;
step 4, adding a fermentation agent into the fermentation substrate, filling the fermentation substrate in a container, and then performing heat-preserved fermentation, and ending the fermentation to obtain a material B; and
step 5, cooling the material B, and then refrigerating the material B to obtain fermented milk;
wherein preparing the extruded WPI-inulin composition in the step 1 specifically includes:
S1, carrying out an extrusion pretreatment on whey protein at an extrusion temperature within the range of 45-55° C. to obtain extruded whey protein, then freeze-drying the extruded whey protein, and grinding the freeze-dried extruded whey protein into powder; and
S2, dissolving powdered whey protein and inulin in deionized water at room temperature to obtain a composition solution after stirring, then freeze-drying the composition solution to obtain a freeze-dried composition, and grinding the freeze-dried composition into powder to obtain the extruded WPI-inulin composition.

3. The method according to claim 2, wherein in the S2, the inulin is added according to 5% to 15% of a total mass of the inulin and the extruded whey protein.

4. The method according to claim 2, wherein a mass-volume ratio (g/mL) of the extruded WPI-inulin composition to the raw milk in the step 2 is in a range of (1.0-3.5): 100;
a mass-volume ratio (g/mL) of the sucrose to the raw milk is in a range of (3-9): 100; and
the stirring is performed for a period of 15-30 min.

5. The method according to claim 2, wherein the preheating is carried out under a temperature within a range of 50-65° C. for a duration of 5-10 min;
homogenizing is carried out under a pressure within a range of 15-25 Mpa;
the sterilizing is carried out at 90-95° C. for 10-15 min by pasteurization; and
the fermentation substrate is cooled to a temperature of a range of 40-42° C.

6. The method according to claim 2, wherein the adding the fermentation agent into the fermentation substrate in the step 4 is adding the fermentation agent at a range of 0.035%-0.045% of the weight of the fermentation substrate; and
a heat-preserved fermentation is performed under a range of 40-42° C. for a range of 4.5-6.0 h.

7. The method according to claim 2, wherein cooling the material B refers to cooling the material B to a range of 20-35° C.; and the refrigerating is carried out at 4° C. for 24 h.

* * * * *